(12) United States Patent
Wolter et al.

(10) Patent No.: US 6,818,133 B1
(45) Date of Patent: Nov. 16, 2004

(54) SEMIPERMEABLE MEMBRANES

(75) Inventors: Herbert Wolter, Tauberbischofsheim (DE); Thomas Ballweg, Wertheim (DE); Werner Storch, Hochberg (DE)

(73) Assignee: Fraunhofer-Gesellschaft zur Foerderung der angewandten Forschung E.V., Munich (DE)

( * ) Notice: Subject to any disclaimer, the term of this patent is extended or adjusted under 35 U.S.C. 154(b) by 0 days.

(21) Appl. No.: 09/393,647

(22) Filed: Sep. 10, 1999

(30) Foreign Application Priority Data

Sep. 10, 1998 (DE) .......................... 198 46 608
Sep. 10, 1998 (DE) .......................... 198 41 440

(51) Int. Cl.[7] .......................... C02F 1/44; B01D 61/00; B01D 53/22
(52) U.S. Cl. .................. 210/640; 210/650; 210/652; 210/490; 210/500.27; 210/500.25; 95/45; 96/4; 96/6; 528/25; 427/255
(58) Field of Search .................. 210/500.27, 490, 210/640, 650–652, 500.25, 500.35; 556/438, 429; 528/21, 25; 521/64; 427/255; 428/447; 95/45; 96/4, 6; 264/41

(56) References Cited

U.S. PATENT DOCUMENTS

| | | | |
|---|---|---|---|
| 3,969,240 A | | 7/1976 | Kolobow et al. ........... 210/321 |
| 4,238,590 A | * | 12/1980 | Scholze et al. |
| 4,374,696 A | | 2/1983 | Schmidt et al. ............ 156/329 |
| 4,374,933 A | * | 2/1983 | Scholze et al. |
| 4,401,567 A | | 8/1983 | Shindo et al. .............. 210/500 |
| 4,446,024 A | | 5/1984 | Baker et al. ............... 210/500 |
| 4,505,985 A | * | 3/1985 | Schmidt et al. |
| 5,233,006 A | * | 8/1993 | Wolter et al. |
| 5,399,738 A | * | 3/1995 | Wolter et al. |
| 5,532,398 A | * | 7/1996 | Wolter et al. |
| 5,717,125 A | * | 2/1998 | Wolter et al. |
| 5,792,881 A | * | 8/1998 | Wolter et al. |

FOREIGN PATENT DOCUMENTS

| | | |
|---|---|---|
| CA | 1321451 | 8/1993 |
| DE | 27 58 414 | 7/1979 |
| DE | 29 25 969 | 1/1981 |
| DE | 30 11 761 | 10/1981 |
| DE | 31 29 064 | 2/1983 |
| DE | 38 26 715 | 2/1990 |
| DE | 39 34 267 | 4/1990 |
| DE | 38 35 968 | 6/1990 |
| DE | 27 58 415 | 8/1990 |
| DE | 40 11 044 | 10/1991 |
| DE | 43 10 733 | 10/1994 |
| DE | 44 05 261 | 8/1995 |
| DE | 44 16 857 | 6/1996 |
| DE | 196 27 198 | 1/1997 |
| DE | 196 27 220 | 1/1997 |
| EP | 0 094 060 | 11/1983 |
| EP | 0 665 049 | 8/1995 |
| EP | 0 668 326 | 8/1995 |

OTHER PUBLICATIONS

A. Larbot et al, "Journal of Membrane Science, 44", *Silica Membranes by the Sol–Gel Process*, pp. 289–303, (1989).

M. Renate de Vos et al, "Journal of Membrane Science, 143", *Improved performance of silica membranes for gas separation*, pp. 37–51, (1998).

Mohammad H. Hassan et al, "Journal of Membrane Science, 104" *Single component and mixed gas transport in a silica hollow fiber membrane*, pp. 27–42, (1995).

* cited by examiner

*Primary Examiner*—Ana Fortuna
(74) *Attorney, Agent, or Firm*—Foley & Lardner LLP

(57) ABSTRACT

The invention relates to semipermeable membranes comprising organically modified silicic-acid polycondensates, to a process for preparing them and to their use in gas exchange and in separation techniques, especially in gas separation, dialysis, pervaporation, and other filtration. The membranes of the invention can be flat or tubular and can be manufactured by conventional methods from viscous liquids obtained by hydrolytic polycondensation of organically modified, hydrolyzable silicon compounds containing C=C double bonds. The membranes are cured by addition polymerization and/or polyaddition of the C=C double bonds.

50 Claims, No Drawings

SEMIPERMEABLE MEMBRANES

FIELD OF THE INVENTION

The invention relates to semipermeable membranes based on organically modified silicic-acid polycondensates, to a process for preparing them and to their use in gas exchange and in separation techniques, especially in gas separation, dialysis, pervaporation, and micro-, ultra- and hyperfiltration. The membranes of the invention are flat or tubular membranes.

BACKGROUND OF THE INVENTION

For the separation of mixtures of substances a very wide variety of membrane materials are known, all of them being capable of improvement in terms of their serviceableness and their economics. For instance, known membrane materials, such as cellulose acetate, have poor temperature and pressure stability and swell severely in organic solvents. A consequence of the poor temperature stability, pressure stability and solvent resistance is that pore size changes continually under service conditions and consequently may result in nonreproducible results and in short membrane service lives.

Ultrafiltration, for example, is carried out predominantly in an aqueous system, so that the requirements of the membranes used for the ultrafiltrations, in terms of mechanical and thermal stability (sterilizability to 140° C.), resistance to acids and alkali's, and customizable hydrophilic/hydrophobic properties are particularly stringent. The polymers used to date to produce membranes are unable to meet these requirements at the same time and, for example, their relatively good thermal stability up to about 140° C. is accompanied by a lack of sufficient mechanical stability.

The surface modifications often necessary for various applications (adjustment of porosity, adsorption behavior, etc.) necessitate further, subsequent processes. Furthermore, materials modified in this way have the disadvantage of having only a modified monolayer at the surface, so making them extremely sensitive to mechanical and chemical exposure.

Commercially customary polymers such as polyethylenes, polypropylenes, polysulfones, polyimides, polymethacrylates, etc. have poor gas permeability (e.g., to $O_2$, $CO_2$, etc.). An increase in permeation on the basis of these polymer types is possible only by incorporating pores. For example, hollow polymer fibers provided with a defined, interconnecting porosity are obtainable directly only by highly complex spinning processes or by subsequent and thus additional process steps. Where polymers modified in this way are used, for example, for gas exchange in fluid systems, there exists the risk of passage of the fluid phase. For example, in the case of $O_2/CO_2$ exchange in the blood in oxygenators during operations on the open thorax, the pores harbor a considerable hazard potential. In the case of relatively long operations in particular, the passage of blood through the pores is observed fairly frequently.

Very high gas permeation values without porosity are realizable only with highly specific polymers (silicones, substituted polysilyipropynes, etc.). The high gas permeability is achieved, however, only at the expense of extreme reductions in the mechanical properties. As permeability increases there is a reduction in strength and modulus of elasticity, i.e., the material becomes increasingly softer. Self-supporting thin films and stable hollow fibers of low wall thickness are therefore not possible. Films and hollow fibers having a degree of permeability which can be established over wide ranges are possible only on the basis of very different types of polymer in conjunction with different production techniques.

Membranes based on silicic-acid heteropolycondensates exhibit excellent resistance to acids and organic solvents and are also highly stable in the pH range up to about 10.

From DE 27 58 415 C2 it is known to process silicic-acid heteropolycondensates to porous membranes by mechanically cutting the polycondensates, which are obtained in compact blocks, into very thin slices which are then used—directly or after being ground beforehand—as membranes. Since, however, the silicic-acid heteropolycondensates are generally not sufficiently elastic, the membrane slices break on cutting, and also the necessary membrane surface area is usually not achieved by this method.

DE 29 25 969 C2 describes another process for producing porous membranes on the basis of silicic-acid heteropolycondensates at the interface between an organic and an aqueous phase. Since, however, the resulting membranes have a high water content owing to the contact with an aqueous phase, the risk exists of excessive shrinkage on drying, and of associated cracking. The hydrolytic polycondensation of the starting components to silicic-acid heteropolycondensates proceeds with substance egress, so that shrinkage of the polycondensates takes place unavoidably.

With the membranes described in DE 27 58 415 C2 and DE 29 25 969 C2, the shaping operation to form the membrane, and its curing, take place by means of an inorganic condensation, i.e., by the construction of an Si—O—Si network. These membranes have very poor mechanical properties; the mechanical stabilities only rarely satisfy the requirements made of them. Furthermore, these membranes are brittle and inflexible.

EP 0094060 B1 discloses a further process for producing membranes on the basis of silicic-acid heteropolycondensates. In that process polycondensation is carried out on the surface of a support which supports the membrane. Here again, the operation of shaping to form the membrane, and its curing, take place by inorganic condensation, i.e., by the construction of an inorganic network. The resultant membranes are supported and not self-supporting.

SUMMARY OF THE INVENTION

It is an object of the present invention to provide semipermeable membranes for gas exchange and for separations, the exchange capacity of said membranes being variable over wide ranges and adapted to the requirements of the particular application. It is another object to provide membranes that may be supported but also that may be self-supporting and in a tubular or flat form. It is yet another object to provide membranes having the permeability and flexibility that can be varied over wide ranges and adapted to the requirements of a particular application. Yet another object is to provide membranes that combine high mechanical stability with high permeability, particularly with respect to gases, inter alia, to allow use for gas exchange and for separation without risking penetration of the fluid phase. Still further, even with high permeation values, such membranes may remain self-supporting. Another object is to provide membranes that are toxicologically acceptable and thus suitable for use in the medical sector.

It is a further object of the present invention to provide a process to manufacture semipermeable membranes having properties that can vary over wide ranges. In embodiments of the process, variation of the process steps allow control of the chemical and physical properties of the membrane, within wide ranges, to the requirements of particular applications. Moreover, embodiments of the process are simple, rapid and inexpensive to carry out. By means of the process it should be possible to manufacture membranes which meet the above-mentioned requirements. Furthermore, the process should also be suitable for the continuous production of hollow fibers and flat membranes. In addition, the surface modifications which are often necessary for various applications, for example, in order to avoid blood coagulation, in order to adjust the polarity, adsorption characteristics, etc., should be realizable both during the synthesis of the material, i.e., in situ, and also subsequently.

One embodiment of the invention is a process for producing a semipermeable membrane, comprising forming a semipermeable membrane from a low-viscosity to resinous liquid produced by hydrolytic polycondensation of a material comprising at least one compound selected from the group consisting of:

a compound of formula I

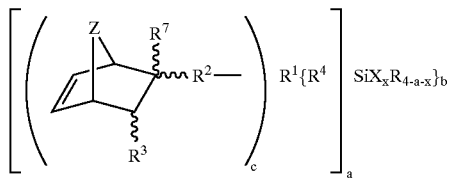

wherein
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, $R^1$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino, $R^2$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino, $R^3$=hydrogen, $R^2$—$R^1$—$R^4$—$SiX_xR_{3-x}$, carboxyl, alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, $R^4$=—(CHR$^6$—CHR$^6$)$_n$—, where n=0 or 1, —CHR$^6$—CHR$^6$—S—R$^5$—, —CO—S—R$^5$—, —CHR$^6$—CHR$^6$—NR$^6$—R$^5$—, —Y—CS—NH—R$^5$, —S—R$^5$, —Y—CO—NH—R$^5$—, —CO—O—R$^5$—, —Y—CO—C$_2$H$_3$(COOH)—R$^5$—, —Y—CO—C$_2$H$_3$(OH)—R$^5$— or —CO—NH$^6$—R$^5$—, $R^5$=alkylene, arylene, arylenealkylene or alkylenearylene comprising between 1 to 15 carbon atoms, further optionally comprising an atom or group selected from the group consisting of oxygen atom, sulfur atom, ester, carbonyl, carboxyl, amido, and amino, $R^6$=hydrogen, alkyl or aryl having 1 to 10 carbon atoms, $R^7$=hydrogen, alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkylcarbonyl, alkoxycarbonyl or NR"$_2$, where R"=hydrogen, alkyl or aryl, Y=—O—, —S— or —NR$^6$—, Z=—O— or —(CHR$^6$)$_m$—, where m=1 or 2, a=1, 2 or 3, where b=1 if a=2 or 3, b=1,2 or 3, where a=1 if b=2 or 3, c=1 to 6, x=1, 2 or 3, where a+x=2, 3 or 4;

(ii) a compound of formula II

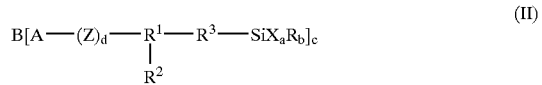

wherein
B=a straight-chain or branched organic radical having at least one C=C double bond and 4 to 50 carbon atoms, R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, $R^3$=alkylene, arylene, arylenealkylene or alkylenearylene comprising between 0 to 10 carbon atoms, wherein any of these radicals optionally is interrupted by an atom or group selected from the group consisting of oxygen atom, sulfur atom, and amino group, X=hydrogen, halogen, hydroxyl, alkoxy, acyloxy, alkylcarbonyl, alkoxycarbonyl or NR"2, where R"=hydrogen, alkyl aryl or alkylaryl, A=O, S or NH if d=1 and Z=CO and
  $R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
  $R^2$=COOH or H,
or
A=O, S, NH or COO if d=1 and Z=CHR', where
R'=H, alkyl, aryl or alkylaryl, and
  $R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
  $R^2$=OH,
or
A=O, S, NH or COO if d=0 and
  $R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
  $R^2$=OH,
or
A=S if d=1 and Z=CO and
$R^1$=N and
$R^2$=H,
a=1, 2 or 3,
b=0, 1 or 2, where a+b=3,
c=1,2,3 or 4;

(iii) a compound of formula III $$\{X_aR_bSi[(R'A)_c]_{(4-a-b)}\}_xB \quad \text{(III)}$$

wherein
A=O, S, PR", POR", NHC(O)O or NHC(O)NR",
B=a straight-chain or branched organic radical derived from a compound B' having at least one (if c=1 and A=NHC(O)O or NHC(O)NR") or at least two C=C double bond(s) and 5 to 30 carbon atoms,
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
R'=alkylene, arylene or alkylenearylene,
R"=hydrogen, alkyl, aryl or alkylaryl,
X=hydrogen, halogen, hydroxyl, alkoxy, acyloxy, alkylcarbonyl, alkoxycarbonyl or NR"$_2$,
a=1,2 or 3,
b=0, 1 or 2,
c=0 or 1,
x=an integer whose maximum value corresponds to the number of double bonds in the compound B' minus 1, or is equal to the number of double bonds in the compound B' if c=1 and A is NHC(O)O or NHC(O)NR", wherein said alkyl and alkenyl radicals optionally are substituted straight-chain, branched or cyclic and comprise 1 to 20 carbon atoms, the aryl optionally is a substituted phenyl, naphthyl or biphenylyl, the alkoxy, acyloxy, alkylcarbonyl, alkoxycarbonyl, alkylaryl, arylalkyl, arylene, alkylene and alkylenearyl radical is a derivative of said alkyl or aryl radical;

(iv) a compound of formula IV $$Y_aSiX_xR_{4-a-x} \quad \text{(IV)}$$

wherein
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
X=hydrogen, halogen, hydroxyl, alkoxy, acyloxy, alkylcarbonyl, alkoxycarbonyl or NR"$_2$, where R"=hydrogen, alkyl, aryl or alkylaryl,
Y=an organic radical having 1 to 30, preferably 1 to 20 carbon atoms and 1 to 5, preferably 1 to 4 mercapto groups,
a=1, 2 or 3,
x=1, 2 or 3, where a+x=2, 3 or 4;
and
(v) a precondensate derived from a compound shown represented in any of formulae I to IV
and wherein said hydrolytic polycondensation material further optionally comprises at least one compound selected from the group consisting of:
(i) a compound of formula V $$X_aSiR_{4-a} \quad \text{(V)}$$

wherein
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkylcarbonyl, alkoxycarbonyl or NR"$_2$, where R"=hydrogen, alkyl, aryl or alkylaryl,
a=1, 2 or 3; and (ii) a precondensate derived from a compound of formula V wherein said hydrolytic polycondensation is conducted by adding a substance selected from the group consisting of water, a solvent, and a condensation catalyst, and wherein said molar ratio of the sum of the compound(s) of formulaes I, II, III and IV to the sum of compound(s) of formula V is between 1:0 and 1:20.

Another embodiment of the invention is a semipermeable membrane produced by the above process. Yet another embodiment is a process selected from the group consisting of gas separation, reverse osmosis, electrodialysis, dialysis, pervaporation, microfiltration, ultrafiltration and hyperfiltration, wherein said process comprises effecting a separation using the semipermeable membrane described herein. Yet additional embodiments readily will be understood from the disclosure.

DETAILED DESCRIPTION OF THE PREFERRED EMBODIMENTS

The objects of the invention are achieved by membranes that are made by processing a liquid of low viscosity to resinous consistency in accordance with conventional methods to form membranes, and, if desired, drying said membranes. The curing of the resultant membranes can be carried out, for example, thermally and/or induced by radiation and/or induced chemically.

The liquid or resin from which the membranes are manufactured is obtained
a) by hydrolytic polycondensation of
  one or more compounds of the general formula I, and/or
  one or more compounds of the general formula II, and/or
  one or more compounds of the general formula III, and/or
  one or more compounds of the general formula IV, and/or
  precondensates derived from the compounds of the formulae I to IV, and, if desired,
  one or more compounds of the general formula V, and/or precondensates derived therefrom,
and, if desired,
b) by addition of
  one or more monomers and/or oligomers which are addition-copolymerizable and/or can be subjected to a (poly)addition reaction,
  and/or of one or more curing catalysts,
  and/or of one or more, soluble and/or volatile, pore generating additives.

The hydrolytic polycondensation is carried out by adding water or moisture and, if desired, in the presence of a solvent and/or a condensation catalyst. Based on the monomers, the molar ratio of the sum of the compounds of the formulae I, II, III and IV to compounds of the formula V is between 1:0 and 1:20.

The liquid or resin used to produce the membranes of the invention represents a polycondensate of hydrolytically condensed silicon compounds of the formulae I and/or II and/or III and/or IV and, if used, V. The polycondensate optionally comprises, water and/or solvent and/or one or more of the abovementioned additives. Depending on its viscosity, the polycondensate may be seen as a more or less viscous liquid or as a resin.

The radicals and indices of formula I have the following meanings. Indices of ≧2 pertain to radicals that may be identical or different.

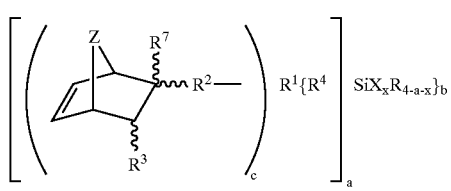

R=alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.

$R^1$=alkylene, arylene, arylenealkylene or alkylenearylene each having 0 to 15 carbon atoms, it being possible for these radicals to comprise oxygen and/or sulfur atoms and/or ester and/or carbonyl and/or carboxyl and/or amido and/or amino groups.

$R^2$=alkylene, arylene, arylenealkylene or alkylenearylene each having 0 to 15 carbon atoms, it being possible for these radicals to comprise oxygen and/or sulfur atoms and/or ester and/or carbonyl and/or carboxyl and/or amido and/or amino groups.

$R^3$ hydrogen, $R^2$—$R^1$—$R^4$—$SiX_xR_{3-x}$, carboxyl, alkyl, alkenyl, aryl, alkylaryl or arylalkyl each having 1 to 15 carbon atoms, it being possible for these radicals to comprise oxygen and/or sulfur atoms and/or ester and/or carbonyl and/or carboxyl and/or amido and/or amino groups.

$R^4$=—$(CHR^6$—$CHR^6)_n$—, where n=0 or 1, —$CHR^6$—$CHR^6$—S—$R^5$—, —CO—S—$R^5$—, —$CHR^6$—$CHR^6$—$NR^6$—$R^5$—, —Y—CS—NH—$R^5$, —S—$R^5$, —Y—CO—NH—H—$R^5$—, —CO—O—$R^5$—, —Y—CO—$C_2H_3$(COOH)—$R^5$—, —Y—CO—$C_2H_3$(OH)—$R^5$— or —CO—$NR^6$—$R^5$—.

$R^5$=alkylene, arylene, arylenealkylene or alklenearylene each having 1 to 15 carbon atoms, it being possible for these radicals to comprise oxygen and/or sulfur atoms and/or ester and/or carbonyl and/or carboxyl and/or amido and/or amino groups.

$R^6$=hydrogen, alkyl or aryl having 1 to 10 carbon atoms.

$R^7$=hydrogen, alkyl, alkenyl, aryl, alkylaryl or arylalkyl each having 1 to 15 carbon atoms, it being possible for these radicals to comprise oxygen and/or sulfur atoms and/or ester and/or carbonyl and/or carboxyl and/or amido and/or amino groups.

X=hydrogen, halogen, hydroxyl, alkoxy, acyloxy, alkylcarbonyl, alkoxycarbonyl or $NR''_2$, where R''=hydrogen, alkyl, alkylaryl or aryl.

Y=—O—, —S— or —$NR^6$—.

Z=—O— or $CHR^6)_m$—, where m=1 or 2.

a=1, 2 or 3, where b=1 if a=2 or 3.

b=1,2 or 3, where a=1 if b=2 or 3.

c=1 to 6.

x=1, 2 or 3, where a+x=2, 3 or 4.

An exhaustive description of organically modified silanes of the general formula I and their preparation, along with concrete examples, is given in DE19627198 C2. The disclosure content of DE 19627198 C2 is hereby incorporated by reference in its entirety. Preferred embodiments of the membranes of the invention use organically modified silanes of the general formula I, and/or precondensates derived therefrom, in which indices a and/or b and/or c adopt the value 1.

In the general formula II, the radicals and indices have the following meaning, wherein radicals noted by indices ≧2 can be identical or different.

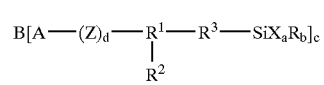

B=a straight-chain or branched organic radical having at least one C═C double bond and 4 to 50 carbon atoms.

R=alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.

$R^3$=alkylene, arylene, arylenealkylene or alkylenearylene each having 0 to 10 carbon atoms, it being possible for these radicals to be interrupted by oxygen atoms and/or by sulfur atoms and/or by amino groups.

X=hydrogen, halogen, hydroxyl, alkoxy, acyloxy, alkylcarbonyl, alkoxycarbonyl or $NR''_2$, where R''=hydrogen, alkyl, aryl or alkylaryl.

A=O, S or NH if d=1 and Z=CO and
  $R^1$=alkylene, arylene or alkylenearylene each having 1 to 10 carbon atoms, it being possible for these radicals to be interrupted by oxygen atoms and/or by sulfur atoms and/or by amino groups, and
  $R^2$=COOH or H.

or

A=O, S, NH or COO if d=1 and Z=CHR', where R''=H, alkyl, aryl or alkylaryl, and
  $R^1$=alkylene, arylene or alkylenearylene each having 1 to 10 carbon atoms, it being possible for these radicals to be interrupted by oxygen atoms and/or by sulfur atoms and/or by amino groups, and
  $R^2$=OH.

or

A=O, S, NH or COO if d=0 and
  $R^1$=alkylene, arylene or alkylenearylene each having 1 to 10 carbon atoms, it being possible for these radicals to be interrupted by oxygen atoms and/or by sulfur atoms and/or by amino groups, and
  $R^2$=OH.

or

A=S if d=1 and Z=CO and
  $R^1$=N and
  $R^2$=H.

a=1,2 or 3.

b=0, 1 or 2, where a+b=3.

c=1, 2, 3 or 4.

An exhaustive description of organically modified silanes of the formula II and their preparation, along with concrete examples, is given in DE 4416857 C1. The disclosure content of DE 4416857 C1 is hereby incorporated by reference in its entirety. Preferred embodiments of the membranes of the invention use organically modified silanes of the general formula II, and/or precondensates derived therefrom, in which the alkyl and/or alkylene and/or alkoxy groups have 1 to 4 carbon atoms. In further preferred embodiments radical B of formula II has one or more acrylate and/or methacrylate groups.

In formula III, the radicals and indices have the following meaning, wherein for indices ≧2 the radicals can be identical or different.

$$\{X_aR_bSi[(R'A)_c]_{(4-a-b)}\}_xB \quad (III)$$

A=O, S, PR", POR", NHC(O)O or NHC(O)NR".
B=a straight-chain or branched organic radical derived from a compound B' having at least one (if c=1 and A=NHC(O)O or NHC(O)NR") or at least two C=C double bond(s) and 5 to 50 carbon atoms.
R=alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.
R'=alkylene, arylene or alkylenearylene.
R"=hydrogen, alkyl, aryl or alkylaryl.
X=hydrogen, halogen, hydroxyl, alkoxy, acyloxy, alkylcarbonyl, alkoxycarbonyl or NR"$_2$.
a=1, 2 or 3.
b=0, 1 or 2.
c=0 or 1.
x=an integer whose maximum value corresponds to the number of double bonds in the compound B' minus 1, or is equal to the number of double bonds in the compound B' if c=1 and A is NHC(O)O or NHC(O)NR".

The above alkyl and alkenyl radicals are unsubstituted or substituted straight-chain, branched or cyclic radicals having 1 or, respectively, 2 to 20 carbon atoms. Aryl is unsubstituted or substituted phenyl, naphthyl or biphenylyl, and the above alkoxy, acyloxy, alkylcarbonyl, alkoxycarbonyl, alkylaryl, arylalkyl, arylene, alkylene and alkylenearyl radicals are derived from the above-defined alkyl and aryl radicals.

An exhaustive description of organically modified silanes of the general formula III and their preparation, along with concrete examples, is given in DE 4011044 C2. The disclosure content of DE 4011044 C2 is hereby incorporated by reference in its entirety. Preferred embodiments of the membranes of the invention use silanes of the general formula III, and/or precondensates derived therefrom, in which the radical B has one or more acrylate and/or methacrylate groups.

In the general formula IV, the radicals and indices have the following meaning, wherein for indices ≧2 the radicals can be identical or different.

$$Y_aSiX_xR_{4-a-x} \quad (IV)$$

R=alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.
X=hydrogen, halogen, hydroxyl, alkoxy, acyloxy, alkylcarbonyl, alkoxycarbonyl or NR"$_2$, where R"=hydrogen, alkyl, aryl or alkylaryl.
Y=an organic radical having 1 to 30, preferably 1 to 20 carbon atoms and 1 to 5, preferably 1 to 4 mercapto groups.
a=1,2 or 3.
x=1, 2 or 3, where a+x=2, 3 or 4.

The alkyl radicals are, for example, straight-chain, branched or cyclic radicals having 1 to 20, especially 1 to 10 carbon atoms and are preferably lower alkyl radicals having 1 to 6, are more preferablyl to 4, carbon atoms. Specific examples are methyl, ethyl, n-propyl, isopropyl, n-butyl, isobutyl, s-butyl, t-butyl, n-pentyl, n-hexyl, cyclohexyl, 2-ethylhexyl, dodecyl, and octadecyl. The alkenyl radicals are, for example, straight-chain, branched or cyclic radicals having 2 to 20, preferably 2 to 10 carbon atoms and are preferably lower alkenyl radicals having 2 to 6 carbon atoms, such as vinyl, allyl and 2-butenyl. Preferred aryl radicals are phenyl, biphenylyl and naphthyl.

The alkoxy, acyloxy, alkylamino, dialkytamino, alkylcarbonyl, alkoxycarbonyl, arylalkyl, alkylaryl, alkylene and alkylenearylene radicals are preferably derived from the abovementioned alkyl and aryl radicals. Specific examples are methoxy, ethoxy, n- and isopropoxy, a, iso-, s- and t-butoxy, monomethylamino, monoethylamino, dimethylamino, diethylamino, N-ethylanilino, acetyloxy, propionyloxy, methylcarbonyl, ethylcarbonyl, methoxycarbonyl, ethoxycarbonyl, benzyl, 2-phenylethyl, and tolyl.

The radicals optionally can carry one or more substituents, such as halogen, alkyl, hydroxyalkyl, alkoxy, aryl, aryloxy, alkylcarbonyl, alkoxycarbonyl, furfuryl, tetrahydrofurfuryl, amino, monoalkylamino, dialkylamino, trialkylammonium, amido, hydroxyl, formyl, carboxyl, mercapto, cyano, isocyanato, nitro, epoxy, SO$_3$H and PO$_4$H$_2$. Among the halogens, fluorine, chlorine and bromine, and especially chlorine, are preferred.

Particular embodiments of the membranes of the invention use silanes of the general formula IV'

$$[(HS—R^5)_nR^6—S—E—R^5]_aSiX_xR_{4-a-x} \quad (IV')$$

in which the radicals and indices are defined as follows:
E=—CO—NH—H—, —CS—NH—, —CH$_2$—CH$_2$— or —CH$_2$—CH(OH)—;
R=as defined for the general formula IV;
R$^5$=alkylene, arylene, arylenealkylene or alkylenearylene each having 1 to 15 carbon atoms, it being possible for these radicals to be interrupted by oxygen atoms and/or by sulfur atoms and/or by ester and/or by carbonyl and/or by carboxyl and/or by amido and/or by amino groups;
R$^6$=alkylene, arylene, arylenealkylene or alkylenearylene each having 1 to 15 carbon atoms, it being possible for these radicals to be interrupted by oxygen atoms and/or by sulfur atoms and/or by ester and/or by carbonyl and/or by carboxyl and/or by amido and/or by amino groups;
X=as defined for the general formula IV;
a=as defined for the general formula IV;
n=2, 3, 4 or 5;
x=as defined for the general formula IV.

An exhaustive description of organically modified silanes of the general formula IV' and their preparation, along with concrete examples, is given in DE 19627220 C2. The disclosure content of DE 19627220 C2 is hereby incorporated by reference in its entirety.

In general formula V, the radicals and indices have the following meaning, wherein for indices ≧2 the radicals can be identical or different.

$$X_aSiR_{4-a} \quad (V)$$

R=alkyl, alkenyl, aryl, alkylaryl or arylalkyl each having 1 to 15 carbon atoms, these radicals can contain oxygen and/or sulfur atoms and/or ester and/or carbonyl and/or carboxyl and/or amido and/or amino groups.
X=hydrogen, halogen, hydroxyl, alkoxy, acyloxy, alkylcarbonyl, alkoxycarbonyl or NR"$_2$, where R"=hydrogen, alkyl, aryl or alkylaryl.
a=1,2 or 3.

The alkyl radicals are, for example, straight-chain, branched or cyclic radicals having 1 to 20, especially 1 to 10 carbon atoms and are preferably lower alkyl radicals having 1 to 6, with particular preference 1 to 4, carbon atoms. Specific examples are methyl, ethyl, n-propyl, isopropyl, n-butyl, isobutyl, s-butyl, t-butyl, n-pentyl, n-hexyl, cyclohexyl, 2-ethylhexyl, dodecyl, and octadecyl. The alkenyl radicals are, for example, straight-chain, branched or cyclic radicals having 2 to 20, preferably 2 to 10 carbon atoms and are preferably lower alkenyl radicals having 2 to 6 carbon atoms, such as vinyl, allyl and 2-butenyl. Preferred aryl radicals are phenyl, biphenylyl and naphthyl.

The alkoxy, acyloxy, alkylamino, dialkylamino, alkylcarbonyl, alkoxycarbonyl, arylalkyl, alkylaryl, alkylene and alkylenearylene radicals are preferably derived from the abovementioned alkyl and aryl radicals. Specific examples are methoxy, ethoxy, n- and isopropoxy, n, iso-, s- and t-butoxy, monomethylamino, monoethylamino, dimethylamino, diethylamino, N-ethylanilino, acetyloxy, propionyloxy, methylcarbonyl, ethylcarbonyl, methoxycarbonyl, ethoxycarbonyl, benzyl, 2-phenylethyl, and tolyl.

The radicals optionally can carry one or more substituents, examples being halogen, alkyl, hydroxyalkyl, alkoxy, aryl, aryloxy, alkylcarbonyl, alkoxycarbonyl, furfuryl, tetrahydrofurfuryl, amino, monoalkylamino, dialkylamino, trialkylammonium, amido, hydroxyl, formyl, carboxyl, mercapto, cyano, isocyanato, nitro, epoxy, $SO_3H$ and $PO_4H_2$. Among the halogens, fluorine, chlorine and bromine, and especially chlorine, are preferred.

Silanes of general formula V are either available commercially or can be prepared in accordance with known methods, as described, for example, in "Chemie und Technologie der Silicone", W. Noll, Verlag Chemie GmbH, Weinheim/Bergstraße (1968).

Without restricting the general nature of the description, concrete examples of silanes of the $CH_3$—Si—$Cl_3$, $CH_3$—Si—$(OC_2H_5)_3$, $C_2H_5$—Si—$Cl_3$, $C_2H_5$—Si—$(OC_2H_5)_3$, $CH_2$=CH—Si—$(OC_2H_5)_3$, $CH_2$=CH—Si—$(OC_2H_4OCH_3)_3$, $(CH_3)_2$—Si—$Cl_2$, $CH_2$=CH—Si—$(OOCCH_3)_3$, $(CH_3)_2$—Si—$(OC_2H_5)_2$, $(C_2H_5)_3$—Si—Cl, $(C_2H_5)_2$—Si—$(OC_2H_5)_2$, $(CH_3)_2(CH_2$=CH)—Si—$Cl_2$, $(CH_3)_3$—Si—Cl, $(t\text{-}C_4H_9)(CH_3)_2$—Si—Cl, $(CH_3O)_3$—Si—$C_3H_6$—NH—$C_2H_4$—NH—$C_2H_4$—$NH_2$, $(CH_3O)_3$—Si—$C_3H_6$—SH, $(CH_3O)_3$—Si—$C_3H_6$—NH—$C_2H_4$—$NH_2$, $(CH_3O)_3$—Si—$C_3H_6$—Cl, $(CH_3)_2(CH_2$=CH—$CH_2$)—Si—Cl, $(CH_3O)_3$—Si—$C_3H_6$—O—C(O)—$C(CH_3)$=$CH_2$, -continued $(C_2H_5O)_3$—Si—$C_3H_6$—$NH_2$, $(C_2H_5O)_3$—Si—$C_3H_6$—CN,

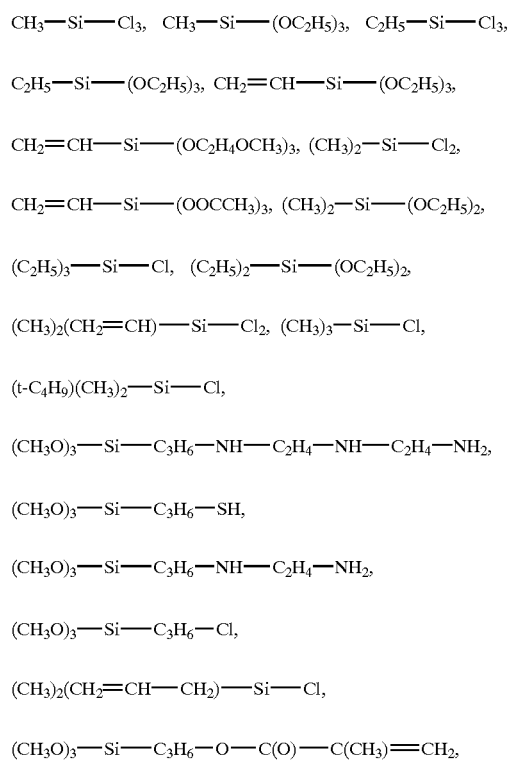

general formula V are as

The silanes of the general formulae I, II, III, IV, IV' and V are hydrolyzable and polycondensable via the radicals X, and the hydrolytic polycondensation constructs an inorganic network via Si—O—Si bridges. The polycondensation takes place preferably in accordance with the sol-gel process, as is described, for example, in DE-A1 2758414, 2758415, 3011761, 3826715 and 3835968. The polycondensation is carried out in the manner conventional in this field, by, for example, adding the required water at room temperature or with slight cooling directly (preferably with stirring and in the presence of a hydrolysis and condensation catalyst) to the silicon compounds to be hydrolyzed, which are present either as such or dissolved in a solvent, and then stirring the resulting mixture for a certain time (one or more hours).

If reactive compounds are present, it is preferred to add the water in stages. Independently of the reactivity of the compounds present, the hydrolysis takes place in general at temperatures between –20 and 130° C. or at the boiling point of the solvent, if employed. As already indicated, the optimum manner of addition of water depends above all on the reactivity of the starting compounds used. For example, the dissolved starting compounds can be added slowly dropwise to an excess of water, or water is added in one or more portions to the starting compounds, as such or in solution. It may also be useful not to add the water as such but to introduce it into the reaction system with the aid of organic or inorganic systems comprising water. In many cases it has proven particularly suitable to introduce the amount of water into the reaction mixture with the aid of moisture-laden adsorbents, e.g., molecular sieves, and of water-comprising organic solvents, e.g., 80% strength ethanol. Alternatively, the addition of water can be made by way of a chemical reaction that liberates water. Examples of such reactions are esterification reactions.

If a solvent is used, suitable solvents in addition to the lower aliphatic alcohols (e.g., ethanol or isopropanol) also include ketones, preferably lower dialkyl ketones, such as acetone or methyl isobutyl ketone, ethers, preferably lower dialkyl ethers such as diethyl ether or dibutyl ether, THF, amides, esters, especially ethyl acetate, dimethylformamide, amines, especially triethylamine, and mixtures thereof.

The starting compounds need not necessarily all be present to start with at the beginning of the hydrolysis (polycondensation). In an advantageous embodiment some of these compounds first are contacted with water and later the remaining compounds are added.

In order as far as possible to avoid instances of precipitation during hydrolysis and polycondensation, the water can be added in two or more stages, e.g., in three stages. In that case it is possible in the first stage, for example, to add from one tenth to one twentieth of the amount of water required for the hydrolysis. After brief stirring, from one fifth to one tenth of the amount of water required can be added, and, after further brief stirring, finally, the remainder can be added.

The condensation time depends on the respective starting components, their quantitative proportions, the catalyst (if used), the reaction temperature, etc. In general, polycondensation occurs at atmospheric pressure but can occur under elevated or reduced pressure.

The polycondensate thus obtained can be processed into a membrane of the invention either as is or after partial or virtually complete removal of the solvent used. In some cases the polycondensate may be stabilized by replacing excess water and the solvent formed, plus any additional solvent (if used), in the product obtained following polycondensation by another solvent. For this purpose the reaction mixture can be thickened, for example, under reduced pressure at slightly elevated temperature to such an extent that it can be still taken up with another solvent without problems.

The polycondensate obtained in this way is more or less a viscous liquid or resin, and may be processed into a flat or tubular membrane by a conventional method. After such shaping operation and after any drying that may be required, the resulting membrane is cured by formation of an organic network.

The silanes of formula I and polycondensates resulting from them can be subjected to an addition polymerization and/or to a polyaddition by way of bicyclic radicals, silanes of formulae II and III and their polycondensates by way of radicals B, and the silanes of formulae IV and IV' and their polycondensates by way of mercapto groups. These addition polymerization and/or polyaddition reactions form an organic network. The polycondensate resulting from the silanes of the formulae I to V, and the membrane manufactured from it, therefore can be cured by addition polymerization and/or by polyaddition. These curing reactions are induced thermally, by radiation and/or chemically. Curing results in an inorganic-organic network, that is, the membranes of the invention possess an inorganic-organic network. By varying the organic and/or the inorganic network, e.g., the network density, it is possible to vary the chemical and physical properties of the membranes of the invention within wide ranges. Thus, a membrane can be made having properties that match the requirements of a particular application.

The polycondensate employed to prepare the membranes of the invention can comprise further additives. Such additives can be added prior to and/or during and/or subsequent to the polycondensation step. These additives may comprise, for example, monomers and/or oligomers which are addition-copolymerizable and/or can be subjected to an addition and/or polyaddition reaction. These monomers and/or oligomers are incorporated into the organic network of the membrane of the invention by way of addition polymerization and/or (poly)addition reactions in the course of the curing of the resultant membrane. Where hydrolyzable silicon compounds having SH and/or C═C and/or amino groups are used, and where they are added prior to the hydrolytic polycondensation, these compounds are incorporated into the inorganic network of the membranes of the invention in the course of the polycondensation and into the organic network of the membranes of the invention in the course of the addition polymerization and/or (poly)addition.

Further additives which may be present in the polycondensate used to prepare the membranes of the invention are, for example, curing catalysts. These are necessary, for example, if curing of the resultant membrane is induced chemically.

The membranes manufactured from the polycondensate are gas permeable and closed. Where porous membranes are required, the polycondensate used to prepare the membranes of the invention can be admixed with additives which generate pores and thus confer porosity on the membranes of the invention. Examples of such additives are volatile and/or soluble adjuvants which after the membrane has cued are removed by, for example, raising the temperature and/or by dissolution, leaving voids in the membrane. Thus, for example, porosity can be generated in the membranes of the invention by adding solvent (e.g., ethyl acetate, ethanol, isopropanol, etc.) to the polycondensate and removing said solvent again after the membrane has cured. Into resin system #1, shown below, it is possible, for example, to stir in up to 25% by weight of different solvents (e.g., ethyl acetate, ethanol, isopropanol, etc.) without losing resin spinnability. After curing, the solvent remaining in the membrane gently can be removed quantitatively by storage at room temperature or forcibly by beating to about 100° C. and/or evacuation. The addition of oils and their removal after the curing of the membrane generates larger voids, i.e., larger pores. Soluble substances such as salts can be added.

An alternative option is to generate pores by adding to the polycondensate blowing agents which, prior to the curing of the membrane, release gases as a result of thermal exposure (e.g., between 150 and 250° C.). Examples of such blowing agents are azo compounds, such as azodicarboxamides. Examples of further additives which can be added for pore generation are hydrazine derivatives (e.g., 4,4'-oxybis (benzenesulfohydrazide), semicarbazides (e.g., p-tolylenesulfonylsemicarbazide), tetrazoles, (e.g., 5-phenyltetrazole), and benzoxazines (e.g., isatoic anhydride).

Pores also can be generated in the membranes of the invention by altering, or by completely or partially removing the organic component of the membrane by thermal cracking or by oxidation; for example, by roasting at 650° C. The result is a pore structure in the nanometer range.

The pore generating additives also can be porous themselves and so confer porosity on the membrane by virtue of their presence. Without restricting the general nature of the description, examples of porous additives of this kind are porous glass particles, perlites, zeolites, silica gel, kieselguhr, alumina or Aerosils in spherical or ground form.

To produce continuous flat membranes, for example, it is preferred to employ solvent-free systems—although solvent-based systems can likewise be processed—which are applied continuously to a rotating roll. The formation of a film by means of a slotted coating bar is followed by curing, e.g., radiation-induced curing, and by detachment and winding of the membranes.

To produce a continuous hollow fiber, for example, it is preferred to use solvent-free systems—although solvent-based systems can likewise be processed—from which hollow fiber is manufactured as follows. First, a resinous polycondensate is extruded through an annular die, the lumen being generated by means of a gas- and/or liquid-carrying inner die. The dimension of the resin filament is established in accordance with conventional methods through variation of spinning parameters, such as, takeoff rate, temperature, pressure, etc. Subsequently, the resin filament is subjected to initial crosslinking via an annular initial-curing component, e.g., a radiation source, directly below the spinning die, which preserves its shape. Final curing is accomplished by means of an all-round irradiator disposed therebelow. The resulting continuous fiber is wound up and rewound. Initial and/or final curing can be accomplished not only by radiation-induced curing but also by self-induced or chemically induced curing. A combination of different curing principles is likewise possible.

Curing of the membranes of the invention can be effected by different curing principles, i.e., thermally, radiatively and/or chemically induced, and in accordance with conventional methods. It may be necessary to add conventional curing catalysts. The methods and principles of curing are described, for example, in DE 4011044 C2, DE 4310733 A1, DE 4405261 A1, DE 4416857 C1, DE 19627198 C2 and DE 19627220 C2.

The membranes of the invention can be produced in both single-phase and two-phase embodiments with and without porosity. The single-phase embodiment is employed in particular where transparency is an important factor. Two-phase membranes are obtained from systems which are not miscible but instead form emulsions. Systems of this kind can be processed either into fiber or film, by producing an emulsion of the immiscible components by means, for example, of conjoint stiring, processing this emulsion to membranes by conventional methods, and curing the immiscible components together in the course of the curing of the resultant membrane. Another variant consists in processing systems where phase separation occurs during the synthesis. By means of these two-phase variants it is possible to manufacture membranes of the invention which consist of a stable organic-inorganic network inlaid with a continuous, highly permeable second phase.

The production process of the membranes of the invention is simple, inexpensive and can be carried out within a very small area. It is suitable for the continuous production of hollow fiber and films, and all common curing principles can be employed. Because of the toxicological acceptability of the materials, the membranes of the invention can be employed without problems in the medical sector. The surface modifications which are often required for various applications, for example, to avoid blood coagulation, to adjust the polarity, adsorption, etc., can be carried out either during the actual synthesis of the material, i.e., in situ, or subsequently. Examples of such surface modifications include for example, coating with heparin, hydrophilic or hydrophobic silane, fluorosilane, and with other biomolecules.

Membranes of the invention combine high mechanical stability with high permeation values, even in the absence of porosity. It is therefore possible to retain high permeation values while producing self-supporting films and hollow fiber, without the risk, for example, of penetrating the fluid phase.

The following exemplary modifications can be used to modify permeability of the membrane to the requirements of a particular application.

Variation of the organic and inorganic structural density

Variation in dimethylsilane units present

Chemical and physical incorporation of organic or inorganic prefabricated, highly permeable monomers, oligomers or polymers Silanization of free SiOH groups with trimethylsilyl units.

Variation of the Inorganic Sructural Density

Without restricting the general nature of the description, the effect of the inorganic structural density on $O_2$ permeability, modulus of elasticity, and strength of the resultant membranes is compared below for various resin systems. The results obtained are summarized in table form. Generally, an increase in inorganic structural density increases mechanical stability and reduces oxygen permeability.

| Resin type | Number of hydrolyzable and condensable groups per base unit | $O_2$ permeability [x] | Modulus of elasticity [MPa] | Strength [MPa] |
|---|---|---|---|---|
| 1 | 3 | $0.09 \cdot 10^{-10}$ | 2640 | 106 |
| 2 | 2 | $0.23 \cdot 10^{-10}$ | 1520 | 59 |
| 3 | 4 | $0.07 \cdot 10^{-10}$ | 3000 | 120 |

| Precursors | Molar ratio |
|---|---|
| Resin type 1: glycerol 1,3-dimethacrylate | 1.0 |
| 3-isocyanatopropyltriethoxysilane | 1.0 |
| 1,12-dodecanediol demethacrylate | 0.2 |
| Resin type 2: trimethylolpropane triacrylate | 1.2 |
| mercaptopropylmethyldimethoxysilane | 1.0 |
| Resin type 3: tris(2-hydroxyethyl) isocyanurate triacrylate | 1.0 |
| mercaptopropylmethyldimethoxysilane | 1.0 |
| tetraethoxysilane | 1.0 |

| Resin type | Number of hydrolyzable and condensable groups per base unit | $O_2$ permeability [cm$^3$/cm · s · cmHg] |
|---|---|---|
| 4 | 2 | $11.5 \cdot 10^{-10}$ |
| 5 | 2.5 | $3.9 \cdot 10^{-10}$ |
| 6 | 3 | $1.2 \cdot 10^{-10}$ |

| Precursors | Molar ratio |
|---|---|
| Resin type 4: trimethylolpropane triacrylate | 1.0 |
| mercaptopropylmethyldimethoxysilane | 1.0 |
| dimethyldiethoxysilane | 4.0 |
| Resin type 5: trimethylolpropane triacrylate | 1.0 |
| mercaptopropylmethyldimethoxysilane | 1.0 |
| dimethyldiethoxysilane | 2.0 |
| methyltrimethoxysilane | 2.0 |
| Resin type 6: trimethylolpropane triacrylate | 1.0 |
| mercaptopropylmethyldimethoxysilane | 1.0 |
| methyltrimethoxysilane | 4.0 |

$O_2$ permeability: $x = cm^3/cm \cdot s \cdot cmHg$

In the case of resin type 1, glycerol 1,3-dimethacrylate and 3-isocyanatopropyltriethoxysilane are first linked to one another in accordance with the following reaction scheme.

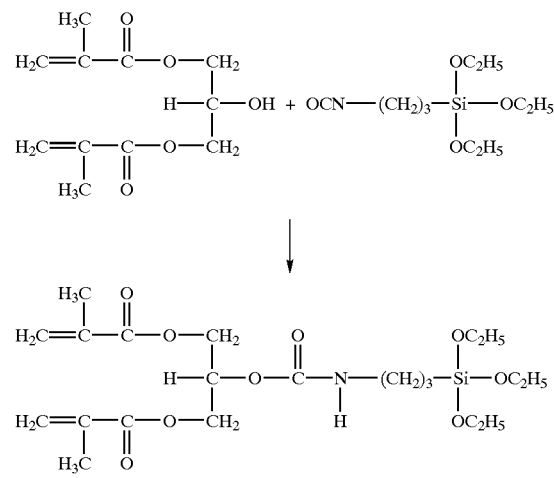

The resultant silane is subjected to hydrolytic polycondensation to construct an inorganic network. The 1,12-dodecanediol dimethacrylate may be added before, during or after polycondensation. The resulting mixture is processed by conventional methods to form membranes whose curing is accompanied by the construction of the organic network as a result of addition polymerization of the methacrylate groups from the polycondensate and from the 1,12-dodecanediol dimethacrylate.

In the case of resin type 2, the trimethylolpropane triacrylate and the mercaptopropylmethyldimethoxysilane are first linked to one another in accordance with the following reaction

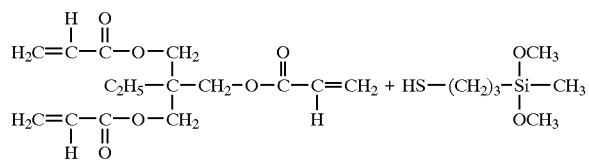

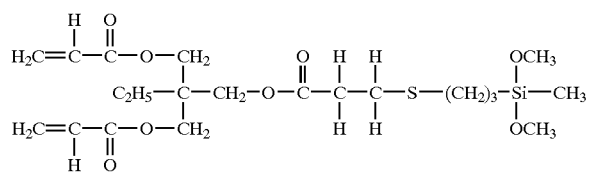

The resultant silane is subjected to hydrolytic polycondensation to construct the inorganic network. The polycondensate is then processed by conventional methods to form membranes whose curing gives rise to the construction of the organic network by addition polymerization of the acrylate groups.

In the case of resin type 3, tris(2-hydroxyethyl) isocyanurate triacrylate and mercaptopropylmethyldimethoxysilane are first linked to one another in accordance with the following reaction scheme.

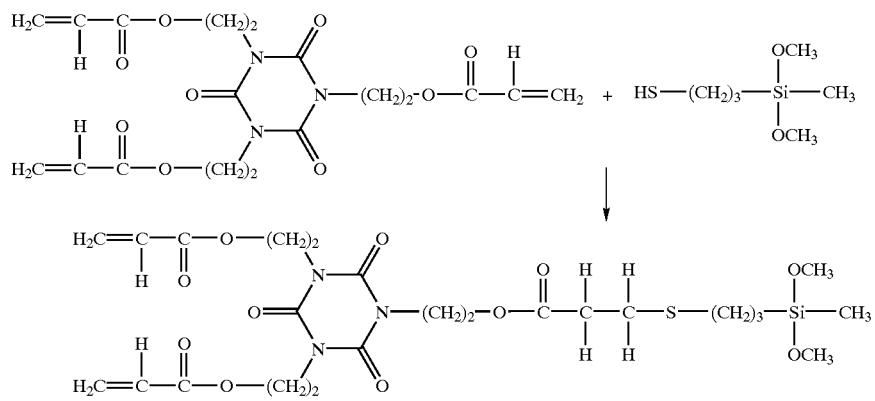

Subsequently, the resulting silane is subjected to hydrolytic polycondensation together with the tetraethoxysilane to construct the inorganic network, and the membrane manufactured therefrom is cured by addition polymerization of the acrylate groups.

In the case of resin type 4, the trimethylolpropane triacrylate and the mercaptopropylmethyldimethoxysilane are first linked to one another analogously to that for resin type 2. Subsequently, the resultant silane is subjected to hydrolytic polycondensation with the dimethyldiethoxysilane, and the membrane manufactured therefrom is cured by addition polymerization of the acrylate groups.

In the case of resin type 5, trimethylolpropane triacrylate and mercaptopropylmethyldimethoxysilane are first linked to one another analogously to that for resin type 2. Subsequently, the resultant silane is subjected to hydrolytic polycondensation with the dimethyldiethoxysilane and with the methyltrimethoxysilane, and the membrane manufactured therefrom is cured by addition polymerization of the acrylate groups.

In the case of resin type 6, trimethylolpropane triacrylate and mercaptopropylmethyldimethoxysilane are first linked to one another analogously to that for resin type 2. Subsequently, the resultant silane is subjected to hydrolytic polycondensation with the methyltrimethoxysilane, and the membrane manufactured therefrom is cured by addition polymerization of the acrylate groups.

With the same organic crosslinking potential, the higher inorganic crosslinking potential of resin type 1 imparts higher modulus of elasticity, higher flexural strength, and a lower $O_2$ permeability coefficient compared to that of resin type 2. The addition of the quadruply hydrolyzable and condensable tetraethoxysilane in the process of making resin type 3 brings about, relative to thte resin of type 2, an increase in inorganic crosslinking density with a simultaneous reduction in $O_2$ permeability. A comparison of resin types 4, 5 and 6 reveals that replacing methyl groups by alkoxy groups which increase the crosslinking potential, reduces $O_2$ permeability.

Variation in Organic Structural Density, Silanization of SiOH Groups, and Incorporation of Permeation-increasing Monomers Without restricting the general nature of the description, the effect of the organic structural density on $O_2$ permeability, modulus of elasticity, and strength of resultant membranes is compared between further resin types. The associated results are summarized in table form. Generally, reducing organic crosslinking potential leads to a marked reduction in mechanical strength and an increase in $O_2$ permeability. Through silanization of SiOH groups and/or incorporation of reactive monomers it is possible to further increase $O_2$ permeability of the membranes.

The polycondensates generally are not filly inorganically condensed. That is, free ≡SiOH groups remain. In the course of silanization these groups can react, for example, to become ≡Si—O—Si(CH$_3$)$_3$ groups. This reaction results (1) in a loosening of the overall structure of the membrane of the invention and (2) in an increase in the number of the Si—O—Si groups, which favors $O_2$ permeability. The silanization is monitored by recording an IR spectrum, and determining loss of the residual SiOH band.

| Resin type | Number of organically crosslinkable groups per base unit | O₂ permeability [x] | Modulus of elasticity [MPa] |
|---|---|---|---|
| 2 | 2 | 0.23 · 10⁻¹⁰ | 1520 |
| 7 | 1 | 3.2 · 10⁻¹⁰ | 11.2 |

| Resin type | O₂ permeability [cm³/cm · s · cmHg] |
|---|---|
| 2 | 2.3 · 10⁻¹⁰ |
| 8 | 13.9 · 10⁻¹⁰ |
| 9 | 13.2 · 10⁻¹⁰ |
| 10 | 20 · 10⁻¹⁰ |

| Precursors | | Molar ratio |
|---|---|---|
| Resin type 2: | trimethylolpropane triacrylate | 1.2 |
| | mercaptopropylmethyldimethoxysilane | 1.0 |
| Resin type 2: | silanized resin type 2 | |
| Resin type 7: | 1,12-dodecanediol dimethacrylate | 1.0 |
| | mercaptopropylmethyldimethoxysilane | 1.0 |
| Resin type 8: | silanized resin type 7 | |
| Resin type 9: | silanized resin type 2 | 2.0 |
| | methacryloxypropyltris-(trimethylsiloxy)silane (TRIS) | 1.0 |
| Resin type 10: | silanized resin type 7 | 3.0 |
| | 1,3-bis(3-methacryloxypropyl)-tetrakis(trimethylsiloxy)disiloxane (TETRAKIS) | 1.0 |

O₂ permeability: x = cm³/cm · s · cmHg

The production of membranes from resin type 2 was described in the discussion of inorganic structural density.

In the case of resin type 7, 1,12-dodecanediol dimethacrylate and mercaptopropylmethyldimethoxysilane are first linked to one another in accordance with the following reaction scheme.

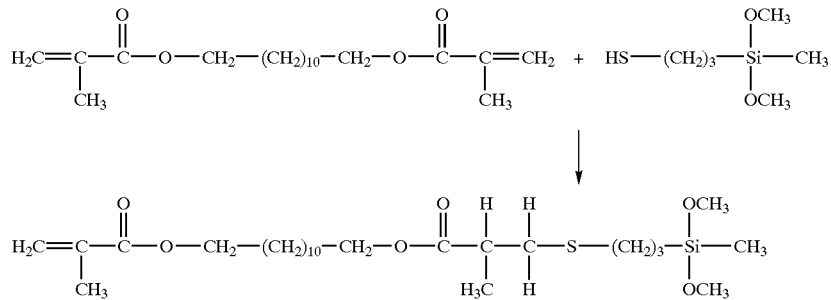

Subsequently, the resultant silane is subjected to hydrolytic polycondensation and the membrane manufactured therefrom is cured by addition polymerization of the methacrylate groups.

In the case of resin type 8, SiOH groups of resin type 7 that remain after polycondensation are first silanized as shown in the following reaction scheme.

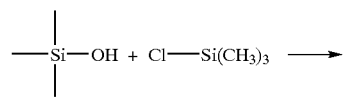

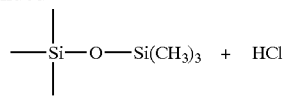

The membranes manufactured therefrom are cured by addition polymerization of methacrylate groups.

In the case of resin types 9 and 10, silanization is followed by the incorporation of reactive monomers TRIS and TETRAKIS, respectively. The membranes manufactured therefrom are cured by addition polymerization of methacrylic groups.

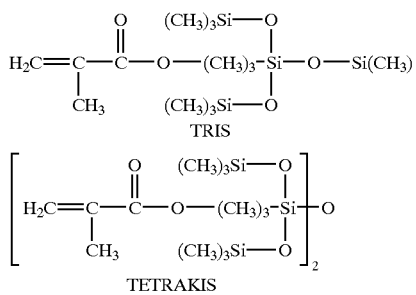

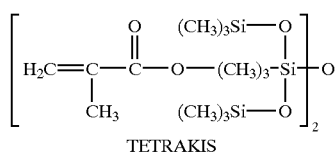

With the same inorganic crossing of resin types 2 and 7, a reduction in the organic crosslinking potential of resin type 7 brings about a marked reduction in the modulus of elasticity and an increase in permeation. Resin type 8 shows a further increase in O₂ permeability in comparison to resin type 7, as a consequence of silanization. In comparison to resin type 8, addition of reactive monomer TRIS in the case of resin type 9 brings about incorporation of end groups, which favor oxygen permeation, into the resultant membrane. In comparison to resin type 8, the addition of the crosslinking component TETRAKIS in the case of resin type 10, further increases O₂ permeability of the resultant membrane.

Incorporation of Dimethylsiloxane Structures

Oxygen permeability of the prepared membrane is increased, for example, through the incorporation of dimethylsiloxane structures. Without restricting the general nature of the description, incorporation into the polycondensate takes place, for example, by condensation of, for instance, dimethyldialkoxysilane, by addition reaction of amino-terminated polydimethylsiloxane, or by co-addition polymerization of acryloxy-terminated polydimethylsiloxane. Use of this treatment can provide a wide range of material that has three orders of magnitude variation of O₂ permeation.

For the following examples, incorporation of dimethylsiloxane into the polycondensate occurs by co-addition polymerization. The results are shown in table form.

| Resin type | Number of —Si(CH$_3$)$_2$—O- groups/base unit | O$_2$ permeability [x] |
|---|---|---|
| 11 | 0 | $0.09 \cdot 10^{-10}$ |
| 12 | 4 | $22 \cdot 10^{-10}$ |
| 13 | 6 | $66 \cdot 10^{-10}$ |
| 14 | 8 | $120 \cdot 10^{-10}$ |
| 15 | 10 | $140 \cdot 10^{-10}$ |

| | Precursors | Molar ratio |
|---|---|---|
| Resin type 11: | glycerol 1,3-dimethacrylate | 1 |
| | isocyanatopropyltriethoxysilane | 1 |
| | dimethyldiethoxysilane | 0 |
| Resin type 12: | glycerol 1,3-dimethacrylate | 1 |
| | isocyanatopropyltriethoxysilane | 1 |
| | dimethyldiethoxysilane | 4 |
| Resin type 13: | glycerol 1,3-dimethacrylate | 1 |
| | isocyanatopropyltriethoxysilane | 1 |
| | dimethyldiethoxysilane | 6 |
| Resin type 14: | glycerol 1,3-dimethacrylate | 1 |
| | isocyanatopropyltriethoxysilane | 1 |
| | dimethyldiethoxysilane | 8 |
| Resin type 15: | glycerol 1,3-dimethacrylate | 1 |
| | isocyanatopropyltriethoxysilane | 1 |
| | dimethyldiethoxysilane | 10 |

O$_2$ permeability: $x = cm^3/cm \cdot s \cdot cmHg$

For resin types 11 to 15, glycerol 1,3dimethacrylate and 3-isocyanatopropyltriethoxysilane were first linked to one another in accordance with the following reaction scheme.

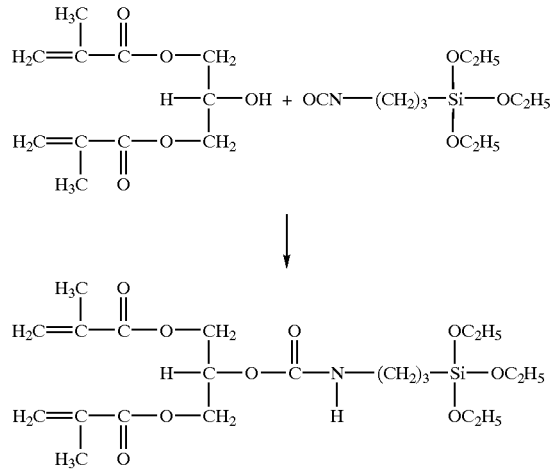

The resultant silane is then subjected to hydrolytic polycondensation, either alone (resin type 11) or together with the dimethyldiethoxysilane (resin types 12 to 15), in order to construct the inorganic network. The polycondensate is processed by conventional methods to manufacture membranes whose curing forms an organic network by addition polymerization of methacrylate groups.

In further exemplary embodiments, incorporation of dimethylsiloxane units into polycondensate takes place by co-polycondensation with dimethyldiethoxysilane. The results obtained are summarized below.

| Resin type | Number of —Si(CH$_3$)$_2$—O- groups/base unit | O$_2$ permeability [x] |
|---|---|---|
| 16 | ½ | $1.7 \cdot 10^{-10}$ |
| 17 | 2 | $4.0 \cdot 10^{-10}$ |
| 18 | 4 | $9.1 \cdot 10^{-10}$ |
| 19 | 6 | $3.1 \cdot 10^{-10}$ |

| | Precursors | Molar ratio |
|---|---|---|
| Resin type 16: | "norbornene-silane" | 1 |
| | trimethylolpropane tris(3-mercaptopropionate) | 1 |
| | dimethyldiethoxysilane | 1/2 |
| Resin type 17: | "norbornene-silane" | 1 |
| | trimethylolpropane tris(3-mercaptopropionate) | 1 |
| | dimethyldiethoxysilane | 2 |
| Resin type 18: | "norbornene-silane" | 1 |
| | trimethylolpropane tris(3-mercaptopropionate) | 1 |
| | dimethyldiethoxysilane | 4 |
| Resin type 19: | "norbornene-silane" | 1 |
| | trimethylolpropane tris(3-mercaptopropionate) | 1 |
| | dimethyldiethoxysilane | 6 |

O$_2$ permeability: $x = cm^3/cm \cdot s \cdot cmHg$

First, the "norbornene-silane" of resin types 16 to 19 is prepared in accordance with the following reaction scheme

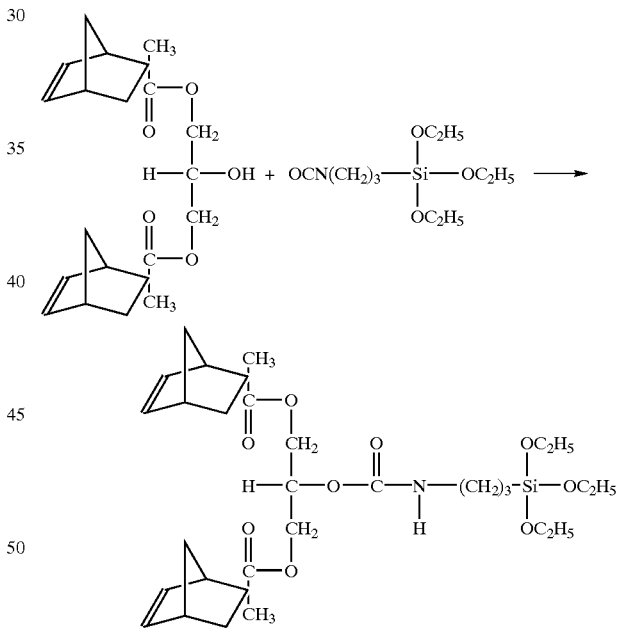

and then subjected to hydrolytic polycondensation with dimethyldiethoxysilane. The resultant polycondensate is admixed with trimethylolpropane tris(3-mercaptopropionate) and processsed to membranes. The membranes are cured by radiation-induced polyaddition of the trimethylolpropane tris(3-mercaptopropionate) onto C=C double bonds of the radicals.

In the examples that follow, incorporation of dimethylsiloxane units into the polycondensate occurs by addition reaction of aminopropyl-terminated polydimethylsiloxane with about 65 —Si(CH$_3$)$_2$—O— segments (=DMS A 21). The results obtained are summarized below.

| Resin type | Number of —Si(CH$_3$)$_2$—O- groups/base unit | O$_2$ permeability [x] |
|---|---|---|
| 20 | 2 | 19 · 10$^{-10}$ |
| 21 | 6 | 160 · 10$^{-10}$ |

| | Precursors | Molar ratio |
|---|---|---|
| Resin type 20: | trimethylolpropane triacrylate | 1.2 |
| | mercaptopropylmethyldimethoxysilane DMS A 21 | 1.0 |
| | solvent: n-butyl acetate | 0.03 |
| Resin type 21: | trimethylolpropane triacyrylate | 1.2 |
| | mercaptopropylmethyldimethoxysilane DMS A 21 | 1.0 |
| | solvent: n-butyl acetate | 0.09 |

O$_2$ permeability: x = cm$^3$/cm · s · cmHg

For resin types 20 and 21, the trimethylolpropane triacrylate and the mercaptopropylmethyldimethoxysilane are first linked to one another according to the following reaction scheme.

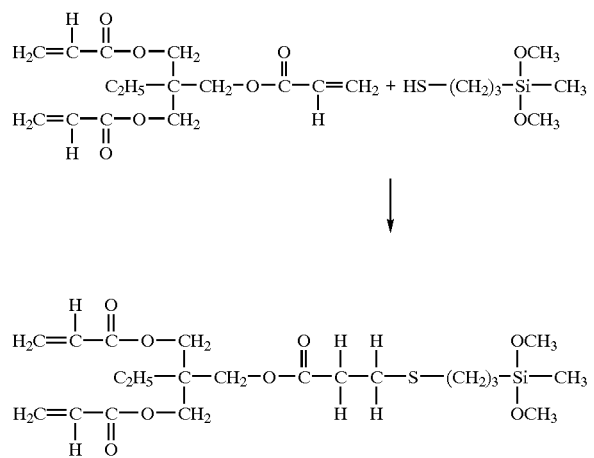

For further processing of the resultant silane into membranes according to the invention, two variants are particularly important:

The resultant silane is first subjected to hydrolytic polycondensation to construct the inorganic network, and the polycondensate is then linked to the polydimethylsiloxane via the addition reaction of acrylate and amino groups.

The resultant silane is first linked to polydimethylsiloxane via the addition reaction of acrylate and amino groups, and the addition product is subjected to hydrolytic polycondensation to construct the inorganic network.

The membrane manufactured from the resultant polycondensate then is cured by addition polymerization of acrylate groups. This constructs the organic network. The solvent is removed quantitatively.

In the exemplary embodiment which follows, dimethylsiloxane units are incorporated into polycondensate by co-addition polymerization with a relatively short-chain polydimethylsiloxane that contain terminal acrylate groups and which consists of about 14 dimethylsiloxane units (PDMS U22 from ABCR). The results obtained are shown below.

| Resin type | Number of —Si(CH$_3$)$_2$—O- groups/base unit | O$_2$ permeability [x] |
|---|---|---|
| 22 | 1.5 | 6.8 · 10$^{-10}$ |

| | Precursors | Molar ratio |
|---|---|---|
| Resin type 22: | glycerol 1,3-dimethacrylate | 8.0 |
| | 3-isocyanatopropyltriethoxysilane | 8.0 |
| | 1,12-dodecanediol dimethacrylate | 1.6 |
| | PDMS U22 | 1.0 |

O$_2$ permeability: x = cm$^3$/cm · s · cmHg

First, analogously to resin type 1, glycerol 1,3-dimethacrylate and 3-isocyanatopropyltriethoxysilane are linked to one another. The resultant silane is subjected to hydrolytic polycondensation to construct the inorganic network. The 1,12-dodecanediol dimethacrylate and/or PDMS U22 can be added before, during or after the polycondensation. Then the PDMS U22 is chemically anchored in the polycondensate by co-addition polymerization of acrylate and methacrylate groups. The resultant mixture is processed by conventional methods to form membranes. During curing of the membranes the organic network is built up further by addition polymerization of remaining methacrylate groups.

The table below summarizes O$_2$ permeabilities of silanized and nonsilanized systems. It is clear that silanization of free —OH units by, for example, trimethylsilyl units causes an increase in O$_2$ permeability.

| Resin type | O$_2$ permeability [x] silanized | O$_2$ permeability [x] nonsilanized |
|---|---|---|
| 2 | 2.3 · 10$^{-10}$ | 0.23 · 10$^{-10}$ |
| 4 | 25 · 10$^{-10}$ | 11.5 · 10$^{-10}$ |
| 7 | 13.9 · 10$^{-10}$ | 3.2 · 10$^{-10}$ |

O$_2$ permeability: x = cm$^3$/cm · s · cmHg

The preparation of and the precursors for resin types 2, 4 and 7 were described in the context of variation of their organic and inorganic structural densities. The silanization of the polycondensates occurs by reaction with trimethylchlorosilane, according to the following reaction scheme.

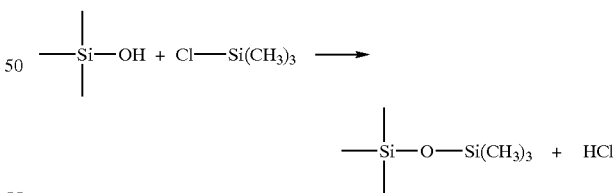

Alternatively, silanization can be carried out by adding hexamethyldisilazane (HMDS) to the tetrahydrofuran (THF)-diluted batch under an argon atmosphere. This reaction likewise converts free Si—OH groups to Si—CH$_3$ groups.

The membranes manufactured as described above are cured by addition polymerization of acrylate and/or methacrylate groups. This silanization does not effect process parameters during spinning or film casting, provided that the silanization process occurs directly prior to further processing and so does not influence the aging effect.

Example of Two-phase Systems

| | Resin type | $O_2$ Permeability [x] | |
|---|---|---|---|
| | 23 | $21 \cdot 10^{-10}$ | |
| | Precursors | | Molar ratio |
| Resin type 23: | trimethylolpropane triacrylate | | 1 |
| | mercaptopropylmethyldimethoxysilane | | 1 |
| | dimethyldiethoxysilane | | 4 |
| | DMS A 21 | | 0.33 |

$O_2$ permeability: $x = cm^3/cm \cdot s \cdot cmHg$

For resin type 23, trimethylolpropane triacrylate and mercaptopropylmethyldimethoxysilane are first linked to one another as described for resin type 4. The silane produced is subjected to hydrolytic polycondensation together with dimethyldiethoxysilane. The resultanting polycondensate is immiscible with amino-terminated polydimethylsiloxane. A two-phase mixed system is obtained which can be processed into a membrane that has a milky cloudiness and which is cured by addition polymerization of the acrylate groups.

The membranes of the invention can be used for separation processes, for example, in ultrafiltration or hyperfiltration technology, in dialysis, in gas separation, in gas permeation, in electrodialysis, in extracorporal artificial respiration, and as synthetic blood vessels or in medical engineering (e.g., as a substitute for PVC or silicone tubes). The membranes exhibit an excellent permeation rate for $O_2$ and $CO_2$, and thus particularly are suitable for use, for example, in oxygenators.

Next, membrane manufacture is illustrated with specific working examples.

Working examples 1 to 3 relate to the production of films and hollow fibers or capillaries. These systems are highly crosslinked, nonporous and comparatively impermeable to gases.

Example 4 concerns modifying a basic system, for yet further reduced gas permeability by incorporation of tetraethoxysilane (TEOS) into the membrane.

Examples 5 to 10 show controlled modifications to increase gas permeability. Gas permeability is indicated as $O_2$ permeability (unit: barrer=$10^{-10}$ cm$^3$ (STP)/cm·s·cmHg).

Example 11 concerns the production of porous structures and Example 12 relates to microporous systems obtained by pyrolysis of membranes.

EXAMPLE 1

| Precursors: | glycerol 1,3-dimethacrylate | 1 mol |
|---|---|---|
| | 3-isocyanatopropyltriethoxysilane | 1 mol |
| | 1,12-dodecanediol dimethacrylate | 0.2 mol |

The resin is synthesized as described in DE 195 36 498 A1, page 4, lines 15 to 62.

Hollow Fiber Production:

The resin (viscosity at process temperature (10° C.): about 100 Pas) admixed with a photoinitiator (e.g., 2% Irgacure 184, from Ciba Geigy) is extruded through an annular die (external diameter: about 1 mm, thickness of annulus: about 0.2 mm). The hollow filament geometry initially is stabilized by means of a second, concentric inner die and flushed with $N_2$ until organic curing is effected by a combination of two UV radiation units (e.g., Blue Point II, from Hönle, with an all-round irradiator F 300, from Fusion).

| Spinning parameters: | temperature | 8° C. |
|---|---|---|
| | pressure | 15 bar |
| | takeoff speed | 0.8 m/s |

The hollow fiber is subsequently wound up. By varying the spinning parameters (spinning-mass temperature, pressure, takeoff speed, gas flow rate through the inner channel) it is possible to vary the fiber geometry over wide ranges. In the present case, the minimum fiber geometries obtained in long-term operation were about 50 μm for the external diameter and about 10 μm for the wall thickness. The largest hollow fiber dimensions obtained were about 2 mm for the external diameter and 0.2 mm for the wall thickness.

Film Production:

The resin admixed with a photoinitiator (e.g., 1% Irgacure 184, from Ciba Geigy) is applied to a highly polished roll by means of a slotted coating bar. Following passage through a UV curing unit (e.g., UVAPRINT CM, from Hönle) the film is detached and wound up. By varying the rotary speed of the rolls, the roll temperature and the size of the slot. Film thicknesses of between about 30 μm and 200 μm were obtained.

| Properties: | |
|---|---|
| $O_2$ permeation coefficient [$10^{-10}$ cm$^3$ (STP)/cm · s cmHg]: | 0.09 |
| Modulus of elasticity [MPa]: | 2640 |
| Tensile strength [MPa]: | 106 |

EXAMPLE 2

| Precursors: | trimethylolpropane triacrylate (TMPTA) | 1.2 (1) mol |
|---|---|---|
| | mercaptopropylmethyldimethoxysilane | 1 mol |

The resin is synthesized as described in DE 40 11 044 C2 in Example 1 on page 10, lines 28 to 50.

Fiber/film Production:

Fiber/film production is carried out as described in Example 1. The minimum hollow fiber dimensions obtained were about 350 μm for the external diameter and 50 μm for the wall thickness.

| Properties: | |
|---|---|
| $O_2$ permeation coefficient [$10^{-10}$ cm$^3$ (STP)/cm · s cmHg]: | 0.23 |
| Modulus of elasticity [MPa]: | 1520 |
| Tensile strength [MPa]: | 59 |

EXAMPLE 3

| Precursors: | "norbornene-silane" | 1 mol |
| --- | --- | --- |
| | dimethyldiethoxysilane | 2 mol |
| | trimethylolpropane tris(3-mercapto-propionate) | 0.47 mol |

The ratio of SH groups to C=C double bonds is 0.71:1.
Synthesis of "Norbornene-silane":
This material was made as described for resin types 16 to 19 in DE 196 27 198 C2, Examples 11 and 12 on page 34, line 42 to page 35, line 22 of that document, which is herein incorporated by reference in its entirety.
Synthesis of the Resin:
Following the introduction of 13.31 g (21.9 mmol) of "norbornene-silane", 6.49 g (43.8 mmol) of dimethyldiethoxysilane are weighed out and stirred at 30° C. For hydrolysis and condensation, 2.76 g of water (corresponding to 2 $H_2O$ per OR group) and catalyst are added. After about 28 h of stirring at 30° C., ethyl acetate is added, the product is extracted by shaking in water, and the batch is worked up. The resultant resin exhibits a pronounced and manageable aging effect (viscosity increase from 1000 to 3000 Pa·s within 20 days (25° C.)) and good spinnability. Trimethylolpropane tris(3-mercaptopropionate) is added to this resin shortly before further processing into fibers/films.
Fiber Production:
Hollow tubes having external diameters of about 1000 μm and wall thicknesses of 100 μm were produced which had high flexibility (80% elongation at break).

EXAMPLE 4

Tetraethoxysilane (TEOS)-modified base systems

| Precursors: | tris(2-hydroxyethyl) isocyanurate triacrylate (SR 368) | 1 mol |
| --- | --- | --- |
| | mercaptopropylmethyldimethoxysilane | 1 mol |
| | tetraethoxysilane (TEOS) | 0.5 mol |
| | solvent: ethoxyethyl acetate | 42.5% by weight |

Synthesis:
66.34 g (0.37 mol) of mercaptopropylmethyldimethoxysilane are added dropwise under an inert gas atmosphere to 155.6 g (0.37 mol) of SR 368 in 370 ml of ethoxyethyl acetate. 23.95 g of an ethanolic KOH solution are added slowly (dropwise) with cooling. For hydrolysis and condensation of the methoxy groups, 10.64 g of 0.5 N HCl are added dropwise. After 5 h of stirring, TEOS and 21.88 g of 0.12 N HCl are added. After 20 h of stirring at RT, the batch is subjected to extraction by shaking with water and filtered and the filter product is concentrated on a rotary evaporator to a solids content of 57.5% by weight.
Film Production:
To avoid cracking from shrinkage that accompanies the addition polymerization, curing was carried out at very low radiative intensity (approximately 0.01 $W/cm^2$). After curing, the solvent was removed as slowly as possible.
Properties:
Relative to the resin from Example 2, the addition of the quadruply hydrolyzable and condensable TEOS brings about an increase in the inorganic crosslinking potential while at the same time reducing the oxygen permeability to a value of 0.07. Porosity as a consequence of the removal of solvent was not detected.

EXAMPLE 5

Replacement of a methyl group for an alkoxy group, which increases crosslinking potential, also increases mechanical stability and simultaneously reduces permeability.

| Resin A | Precursors: | TMPTA | 1 mol |
| --- | --- | --- | --- |
| | | mercaptopropylmethyldimethoxysilane | 1 mol |
| | | dimethyldiethoxysilane | 4 mol |
| | | methyltrimethoxysilane | — |
| | $O_2$ permeability [$10^{-10}$ $cm^3$ (STP)/cm · s cmHg]11.5 | | |
| Resin B | Precursors: | TMPTA | 1 mol |
| | | mercaptopropylmethyldimethoxysilane | 1 mol |
| | | dimethyldiethoxysilane | 2 mol |
| | | methyltrimethoxysilane | 2 mol |
| | $O_2$ permeability [$10^{-10}$ $cm^3$ (STP)/cm · s cmHg] 3.9 | | |
| Resin C | Precursors: | TMPTA | 1 mol |
| | | mercaptopropylmethyldimethoxysilane | 1 mol |
| | | dimethyldiethoxysilane | — |
| | | methyltrimethoxysilane | 4 mol |
| | $O_2$ permeability [$10^{-10}$ $cm^3$ (STP)/cm · s cmHg] 1.2 | | |

Synthesis of Resin A:
54.15 g (0.3 mol) of mercaptopropylmethyldimethoxysilane are added under an argon atmosphere and with ice cooling to 89.03 g (0.3 mol) of trimethylolpropane triacrylate (TMPTA) in 300 ml of ethyl acetate. 19.55 g of an ethanolic KOH solution then are added slowly (dropwise). Then 8.73 g of 0.5 N HCl are added and stirred for 10 minutes. Then 178.03 g (1.2 mol) of dimethyldiethoxysilane and 35.0 g of 0.12 N HCl are added. After 23 h of stirring at RT, the batch is extracted by shaking with water and filtered. The filter product is concentrated on a rotary evaporator to a solids content of 89%. Resin variants B and C are synthesized using the same procedures as resin A.

EXAMPLE 6

Incorporation of Crosslinkers to Promote $O_2$ Permeation (TETRAKIS)

Doubly crosslinkable 1,3-bis(3-methacryloyloxypropyl) tetrakis(trimethylsiloxy)disiloxane (TETRAKIS) facilitates organic crosslinking potential while increasing $O_2$ permeation. Thus, this crosslinker can be combined in a system that features low crosslinking as shown below.

| Resin A | Precursors: | dodecanediol dimethacrylate | 1 mol |
| --- | --- | --- | --- |
| | | mercaptopropylmethyldimethoxysilane | 1 mol |
| | $O_2$ permeability [$10^{-10}$ $cm^3$ (STP)/cm · s cmHg]:3 | | |
| Resin B | Precursors: | dodecanediol dimethacrylate | 1 mol |
| | | mercaptopropylmethyldimethoxysilane | 1 mol |
| | | TETRAKIS | ⅓ mol |
| | $O_2$ permeability [$10^{-10}$ $cm^3$ (STP)/cm · s cmHg]: 20 | | |

EXAMPLE 7

Incorporation of Dimethylsiloxane by Condensation

Integration of dimethylsiloxane by cocondensation of the precursor with dimethyldiethoxysilane can be varied over wide ranges. This results in a material having oxygen permeation that can vary over 3 orders of magnitude.

| Resin A | Precursors: | glycerol 1,3-dimethacrylate | 1 mol |
| --- | --- | --- | --- |
| | | isocyanatopropyltriethoxy-silane | 1 mol |
| | | dimethyldiethoxysilane | 0 mol |
| | $O_2$ permeability [$10^{-10}$ cm$^3$ (STP)/cm · s cmHg]: 0.09 | | |
| Resin B | Precursors: | glycerol 1,3-dimethacrylate | 1 mol |
| | | isocyanatopropyltriethoxy-silane | 1 mol |
| | | dimethyldiethoxysilane | 4 mol |
| | $O_2$ permeability [$10^{-10}$ cm$^3$ (STP)/cm · s cmHg]: 22 | | |
| Resin C | Precursors: | glycerol 1,3-dimethacrylate | 1 mol |
| | | isocyanatopropyltriethoxy-silane | 1 mol |
| | | dimethyldiethoxysilane | 6 mol |
| | $O_2$ permeability [$10^{-10}$ cm$^3$ (STP)/cm · s cmHg]: 66 | | |
| Resin D | Precursors: | glycerol 1,3-dimethacrylate | 1 mol |
| | | isocyanatopropyltriethoxy-silane | 1 mol |
| | | dimethyldiethoxysilane | 8 mol |
| | $O_2$ permeability [$10^{-10}$ cm$^3$ (STP)/cm · s cmHg]: 110 | | |
| Resin E | Precursors: | glycerol 1,3-dimethacrylate | 1 mol |
| | | isocyanatopropyltriethoxy-silane | 1 mol |
| | | dimethyldiethoxysilane | 10 mol |
| | $O_2$ permeability [$10^{-10}$ cm$^3$ (STP)/cm · s cmHg]: 140 | | |

Synthesis of Resin C:

72.0 g (0.29 mol) of 3-isocyanatopropyltriethoxysilane are added dropwise with cooling to 66.4 g (0.29 mol) of glycerol 1,3-dimethacrylate and dibutyltin dilaurate (as addition catalyst). After 21 h of stirring, 290 ml of ethyl acetate, 258.9 g (1.75 mol) of dimethyldiethoxysilane and 63.3 g of water (including catalyst) are added. After 6 d of stirring, the mixture is subjected to extraction by shaking with water, filtered and concentrated on a rotary evaporator. The volatile constituents are removed completely using an oil pump. Solids content were 95.6% and the viscosity after 1 h was 2.2 Pas (25° C.).

Resin variants A, B, D and E are synthesized in a like manner.

EXAMPLE 8

Incorporation of Dimethylsiloxane by Addition Reaction Via Amino end Groups

Amino-terminated polydimethylsiloxane DMS A 21 (Gelest) is subjected to an addition reaction by reacting the amino groups with acrylate groups of the system from Example 2.

| Resin A | Precursors: | resin system from Example 2 | 1 mol |
| --- | --- | --- | --- |
| | | DMS A 21 | 0.03 mol |
| | $O_2$ permeability [$10^{-10}$ cm$^3$ (STP)/cm · s cmHg]: 19 | | |
| Resin B | Precursors: | resin system from Example 2 | 1 mol |
| | | DMS A 21 | 0.09 mol |
| | $O_2$ permeability [$10^{-10}$ cm$^3$ (STP)/cm · s cmHg]: 160 | | |
| | Modulus of elasticity [MPa] | | 210 |
| | Flexural strength [MPa] | | 25 |

The solvent, n-butyl acetate, was removed quantitatively after curing.

EXAMPLE 9

Incorporation of Dimethylsiloxane Structures by Co-addition Polymerization of Acryloyloxy-terminated Polydimethylsiloxane PDMS U22 (ABCR)

The relatively short-chain PDMS U22 from ABCR, containing about 14 polydimethylsiloxane units, is miscible in any proportion with, for example, the system from Example 1. This system remained spinnable to hollow fibers up to a molar ratio of about 8:1.

| Precursors | system from Example 1 | 8 mol |
| --- | --- | --- |
| | acryloyloxy-terminated polydimethyl-siloxane PDMS U22 | 1 mol |

EXAMPLE 10

Generation of Porosities in Hollow Fibers

The division of the organic curing process in the course of hollow fiber production into an initially incomplete and merely form-preserving initial curing, directly below the exit from the spinning die, and a subsequent, complete through-curing in an all-round UV irradiator, offers one possibility for pore generation in UV-curing, solvent-based systems. The system from Example 1 was diluted with 20% of solvent (ethyl acetate) with no deleterious effect on spinnability. Following addition of 2% UV initiator Irgacure 184, the system was extruded as described to a hollow filament (spinning parameters: pressure=8 bar, filament temperature=5° C., takeoff speed=0.8 m/s). Following initial curing by a low-power UV irradiator (Blue Point II, from Hönle) about 5 mm below the spinning die, the hollow fiber is still tacky but already dimensionally stable. The solvent is expelled by heating with an IR irradiator and complete curing is carried out in the all-round UV irradiator. The result is a porous hollow fiber.

EXAMPLE 11

Production of a Microporous, Silicatic Hollow Fiber

Membranes according to this embodiment of the the invention comprise inorganic Si—O—Si units that are combined with organically addition-polymerized carbon units, as seen at the molecular level. Removal of the organic fraction, for example, from an inorganically highly-crosslinked hollow fiber of the invention by pyrolysis and oxidation creates a microporous hollow fiber with a narrow pore-radius distribution.

| Precursors | glycerol 1,3-dimethyacrylate | 1 mol |
| --- | --- | --- |
| | 3-isocyanatopropyltriethoxysilane | 1 mol |
| | tetraethoxysilane (TEOS) | 0.5 mol |

The TEOS-modified resin system was processed to hollow fibers as described.

| Spinning parameters: | pressure | 18 bar |
| --- | --- | --- |
| | filament temperature | 45° C. |
| | takeoff speed | 0.3 m/s |

This procedure yielded hollow fibers having external diameters of 231 $\mu$m and wall thicknesses of 36 $\mu$m. These hollow fibers were prepyrolyzed in a tube furnace by slow heating to 650° C., initially under a nitrogen atmosphere, and then cooled and oxidized fully in air by heating them again to 650° C. The resultant hollow fibers had external diameters of 126 μm and wall thicknesses of 20 μm. Nitrogen adsorption was used to determine porosity and showed a BET surface area of from 300 to 800 m²/g. Micropore analysis revealed an average pore radius of <1 nm.

All references to publications and filed applications are specifically incorporated by reference in their entireties. Priority documents DE 19846608.0 filed Oct. 9, 1998 and DE 19841440.4 filed Sep. 10, 1998 are specifically incorporated herein by reference in their entireties.

Given the disclosure of the present invention, one versed in the art would readily appreciate that there may be other embodiments and modifications well within the scope and spirit of the present invention. Accordingly, all expedient modifications readily attainable by one versed in the art from the present disclosure within the scope and spirit of the present invention are to be included as further embodiments of the present invention.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A process for producing a semipermeable membrane, comprising
  (a) preparing a low-viscosity to resinous liquid produced by hydrolytic polycondensation of a material comprising at least one compound selected from the group consisting of:
  (i) a compound of formula I

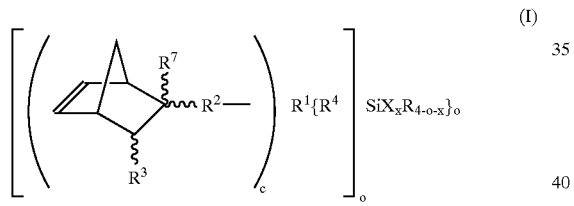

wherein
  R=alkyl, alkenyl, aryl, alkylaryl or arylalkyl comprising between 1 to 15 carbon atoms,
  $R^1$=alkylene, arylene, arylenealkylene or alkylenearylene comprising between 0 to 15 carbon atoms,
  $R^2$=alkylene, arylene, arylenealkylene or alkylenearylene comprising between 0 to 15 carbon atoms,
  $R^3$=hydrogen, $R^2$—$R^1$—$R^4$—$SiX_xR_{3-x}$, carboxyl, alkyl, alkenyl, aryl, alkylaryl or arylalkyl comprising between 1 to 15 carbon atoms,
  $R^4$=(CHR⁶—CHR⁶)$_n$—, where n=0 or 1, —CHR⁶—CHR⁶—S—R⁵—, —CO—S—R⁵—, CHR⁵—CHR⁶—NR⁶—R⁵—, —Y—CS—NH—R⁵, —S—R⁵, —Y—CO—NH—R⁵, —CO—O—R⁵—, —Y—CO—C₂H₃(COOH)—R⁵—, —Y—CO—C₂H₃(OH)—R⁵— or —CO—NR⁶—R⁵—,
  $R^5$=alkylene, arylene, arylenealkylene or alkylenearylene comprising between 1 to 15 carbon atoms,
  $R^6$=hydrogen, alkyl or aryl having 1 to 10 carbon atoms,
  $R^7$=hydrogen, alkyl, alkenyl, aryl, alkylaryl or arylalkyl comprising between 1 to 15 carbon atoms,
  X=hydrogen, halogen, hydroxyl, alkoxy, acyloxy, alkylcarbonyl, alkoxycarbonyl or NR"₂, where R"=hydrogen, alkyl or aryl, Y=—O—, —S— or —NR⁶—,
  Z=—O— or —(CHR⁶)$_m$—, where m=1 or 2,
  a=1, 2 or 3, where b=1 if a=2 or 3,
  b=1, 2 or 3, where a=1 if b=2 or 3
  c=1 to 6,
  x=1, 2 or 3, where a+x=2, 3 or 4;
  (ii) a compound of formula II

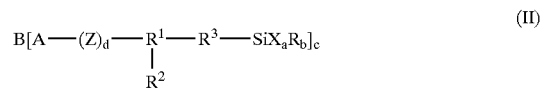

wherein
  B=a straight-chain or branched organic radical having at least one C=C double bond and 4 to 50 carbon atoms,
  R=alkyl, alkenyl, aryl, alkylaryl or arylalkyl comprising between 1 to 15 carbon atoms,
  $R^3$=alkylene, arylene, arylenealkylene or alkylenearylene comprising between 0 to 10 carbon atoms,
  X=hydrogen, halogen, hydroxyl, alkoxy, acyloxy, alkylcarbonyl, alkoxycarbonyl or NR"₂, where R"=hydrogen, alkyl, aryl or alkylaryl,
  A=O, S or NH if d=1 and Z=CO and
  $R^1$=alkylene, arylene or alkylenearylene comprising between 1 to 10 carbon atoms, and
  $R^2$=COOH or H,
  or
  A=O, S, NH or COO if d=1 and Z=CHR', where
  R'=H, alkyl, aryl or alkylaryl, and
  $R^1$=alkylene, arylene or alkylenearylene comprising between 1 to 10 carbon atoms,
  $R^2$=OH
  or
  A=O, S, NH or COO if d=0 and
  $R^1$=alkylene, arylene or alkylenearylene comprising between 1 to 10 carbon atoms, and
  $R^2$=OH,
  or
  A=S if d=1 and Z=CO and
  $R^1$=N and
  $R^2$=H,
  a=1, 2 or 3,
  b=0, 1 or 2, where a+b=3,
  c=1, 2, 3 or 4;
  (iii) a compound of formula III

wherein
  A=O, S, PR", POR", NHC(O)O or NHC(O)NR",
  B=a straight-chain or branched organic radical derived from a compound B' having at least one (if c=1 and A=NHC(O)O or NHC(O)NR") or at least two C=C double bond(s) and 5 to 30 carbon atoms,
  R=alkyl, alkenyl, aryl, alkylaryl or arylalkyl comprising between 1 to 15 carbon atoms,
  R'=alkylene, arylene or alkylenearylene,
  R"=hydrogen, alkyl, aryl or alkylaryl,
  X=hydrogen, halogen, hydroxyl, alkoxy, acyloxy, alkylcarbonyl, alkoxycarbonyl or NR"₂,
  a=1, 2 or 3,
  b=0, 1 or 2,
  c=0 or 1,
  x=an integer whose maximum value corresponds to the number of double bonds in the compound B' minus 1, or is equal to the number of double bonds in the compound B' if c=1 and A is NHC(O)O or NHC(O)NR", wherein said alkyl and alkenyl radicals are straight-chain, branched or cyclic and comprise 1 to 20 carbon atoms, the aryl is a phenyl, naphthyl or biphenylyl, the alkoxy, acyloxy, alkylcarbonyl, alkoxycarbonyl, alkylaryl, arylalkyl, arylene, alkylene and alkylenearyl radical is a derivative of said alkyl or aryl radical;

(iv) a compound of formula IV

$$Y_aSiX_xR_{4-a-x} \quad (IV)$$

wherein
R=alkyl, alkenyl, aryl, alkylaryl or arylalkyl comprising between 1 to 15 carbon atoms,
X=hydrogen, halogen, hydroxyl, alkoxy, acyloxy, alkylcarbonyl, alkoxycarbonyl or NR"$_2$, where R"=hydrogen, alkyl, aryl or alkylaryl,
Y=an organic radical having 1 to 30 carbon atoms and 1 to 5 mercapto groups,
a=1, 2 or 3,
x=1, 2 or 3, where a+x=2, 3 or 4; and (v) a precondensate derived from a compound represented by any of formulae I to IV (b) forming a membrane from the said low-viscosity to resinous liquid, and (c) curing the membrane by forming an organic network using a process selected from the group consisting of thermal curing, radiation-induced curing and chemically induced curing, if necessary, in the presence of additives which are addition-copolymerizable and/or can be subjected to an addition and/or polyaddition reaction.

2. A process as described in claim 1, that further comprises adding to said liquid a substance selected from the group consisting of an addition-copolymerizable monomer, an addition-copolymerizable oligomer, a curing catalyst, and a pore generating additive.

3. The process as claimed in claim 1, that further comprises adding to said liquid at least one monomer or oligomer that subjected to a (poly)addition reaction.

4. The process as claimed in claim 1, wherein said membrane is a flat or tubular membrane.

5. The process as claimed in claim 4, wherein said membrane is manufactured on a support.

6. The process as claimed in claim 1, wherein said liquid comprises polycondensates derived from at least one compound of formula I, the compound characterized by having a structure according to formula I wherein at least one index of formula I selected from the group consisting of a, b and c has the value 1.

7. The process as claimed in claim 1 wherein said liquid comprises at least one polycondensate derived from at least one compound of formula II or III and wherein radical B has at least one acrylate or methacrylate group.

8. The process as claimed in claim 1, wherein said liquid comprises at least one polycondensate derived from at least one compound of formula VI, having the structure:

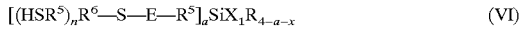

$$[(HSR^5)_nR^6—S—E—R^5]_aSiX_xR_{4-a-x} \quad (VI)$$

wherein
E=—CO—NH—H—, —CS—NH—, —CH$_2$—CH$_2$— or —CH$_2$—CH(OH)—;
R=alkyl, alkenyl, aryl, alkylaryl or arylalkyl comprising between 1 to 15 carbon atoms,
R$^5$=alkylene, arylene, arylenealkylene or alkylenearylene comprising between 1 to 15 carbon atoms,
R$^6$=alkylene, arylene, arylenealkylene or alkylenearylene comprising between 1 to 15 carbon atoms,
X=hydrogen, halogen, hydroxyl, alkoxy, acyloxy, alkylcarbonyl, alkoxycarbonyl or NR"$_2$, where R"=hydrogen, alkyl, aryl or alkylaryl;
a=1, 2 or 3;
n=2, 3, 4 or 5;
x=1, 2 or 3, where a+x=2, 3 or 4.

9. A process according to claim 8, wherein radical R of formula VI further comprises an atom or group selected from the group consisting of an oxygen atom, a sulphur atom, an ester group, a carbonyl group, a carboxy group, an amido group and an amino group.

10. A process according to claim 8, wherein any of radicals R$^5$ and R$^6$ can be interrupted by an atom or group selected from the group consisting of an oxygen atom, a sulphur atom, an ester group, a carbonyl group, a carboxy group, an amido group and an amino group.

11. The process as claimed in claim 1, wherein said liquid comprises polycondensates comprising at least one compound selected from the group consisting of a compound according to formula II or III wherein radical B has at least one acrylate or methacrylate group, and comprises a compound according to the formula VI

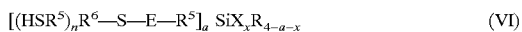

$$[(HSR^5)_nR^6—S—E—R^5]_aSiX_xR_{4-a-x} \quad (VI)$$

wherein
E=—CO—NH—, —CS—NH—, —CH$_2$—CH$_2$— or —CH$_2$—CH(OH)—;
R=alkyl, alkenyl, aryl, alkylaryl or arylalkyl comprising between 1 to 15 carbon atoms,
R$^5$=alkylene, arylene, arylenealkylene or alkylenearylene comprising between 1 to 15 carbon atoms,
R$^6$=alkylene, arylene, arylenealkylene or alkylenearylene comprising between 1 to 15 carbon atoms,
X=hydrogen, halogen, hydroxyl, alkoxy, acyloxy, alkylcarbonyl, alkoxycarbonyl or NR"$^2$, where R"=hydrogen, alkyl, aryl or alkylaryl;
a=1, 2 or 3;
n=2, 3, 4 or 5;
x=1, 2 or 3, where a+x=2, 3 or 4.

12. A process according to claim 11, wherein radical R of formula VI further comprises an atom or group selected from the group consisting of an oxygen atom, a sulphur atom, an ester group, a carbonyl group, a carboxy group, an amido group and an amino group.

13. A process according to claim 11, wherein any of radical R$^5$ and R$^6$ can be interrupted by an atom or group selected from the group consisting of an oxygen atom, a sulphur atom, an ester group, a carbonyl group, a carboxy group, an amido group and an amino group.

14. The process as claimed in claim 1, wherein said liquid further comprises at least one organic compound selected from the group consisting of a compound having at least one mercapto group, a compound having at least one C=C double bond, and a compound having at least one amino group.

15. The process as claimed in claim 1, wherein said liquid comprises at least one polycondensate or oligocondensate having at least one C=C double bond, the polycondensate or oligocondensate being derived from at least one organically modified and hydrolytically condensable silane.

16. The process as claimed in claim 15, wherein said polycondensate or oligocondensate has at least one amino group and is derived from at least one organically modified, hydrolytically condensable silane.

17. The process as claimed in claim 1, wherein said liquid comprises at least one pore generating additive selected from the group consisting of at least one salt, additional liquid, blowing agent, and porous filler.

18. The process as claimed in claim 17, which further comprises removing at least one pore generating additive from said membrane by dissolution, or thermal treatment or both.

19. A semipermeable membrane produced by a process as claimed in claim 1.

20. A process for separating mixtures of substances selected from the group consisting of gas separation, reverse osmosis, electrodialysis, dialysis, pervaporation, microfiltration, ultrafiltration and hyperfiltration, wherein said process comprises separating said substances using the semipermeable membrane as claimed in claim 19.

21. A semipermeable membrane as claimed in claim 19, wherein the membrane is self-supporting.

22. A semipermeable membrane as claimed in claim 21, wherein the membrane has a flat or tubular form.

23. The process for producing a semipermeable membrane according to claim 1, wherein in the formula IV the substituent Y is an organic radical having 1 to 20 carbon atoms and 1 to 4 mercapto groups.

24. A process for producing a semipermeable membrane according to claim 1, comprising
(a) preparing a low-viscosity to resinous liquid produced by hydrolytic polycondensation of a material comprising at least one compound selected from the group consisting of
(i) a compound of formula I,
(ii) a compound of formula II, and
(iii) a compound of formula III; and
(b) curing the membrane by forming an organic network using a process selected from the group consisting of thermal curing, radiation-induced curing and chemically induced curing.

25. A process as set forth in claim 24, wherein curing the membrane according to step (b) is performed in the presence of additives which are addition-copolymerizable and/or can be subjected to an addition and/or polyaddition reaction.

26. A process as set forth in claim 1, wherein radical B in formula III is an organic radical having at least two C=C double bonds.

27. A process as set forth in claim 26, wherein radical B has at least two groups selected from the group consisting of acrylate and methacrylate groups.

28. A process for producing a semipermeable membrane according to claim 1, comprising
(a) preparing a low-viscosity to resinous liquid produced by hydrolytic polycondensation of a material comprising at least one compound selected from the group consisting of
(i) a compound of formula I,
(ii) a compound of formula II, and
(iii) a compound of formula III, wherein radical B is an organic radical having at least two C=C double bonds; and
(b) curing the membrane by forming an organic network using a process selected from the group consisting of thermal curing, radiation-induced curing and chemically induced curing.

29. A process as set forth in claim 28, wherein radical B in formula III has at least two groups selected from the group consisting of acrylate and methacrylate groups.

30. The process according to claim 1, wherein said process further comprises drying the membrane after curing the membrane from the low-viscosity to resinous liquid.

31. A process according to claim 1, wherein any of radicals R, $R^1$, $R^2$, $R^3$, $R^5$, and $R^7$ of formula I; radical R of formula II, radical R of formula III and radical R of formula IV may further comprise an atom or group selected from the group consisting of an oxygen atom, a sulphur atom, an ester group, a carbonyl group, a carboxy group, an amido group and an amino group.

32. A process according to claim 1, wherein any of radicals $R^1$ and $R^3$ of formula II may be interrupted by an atom or group selected from the group consisting of an oxygen atom, a sulfur atom and an amino group.

33. A process according to claim 1, wherein any of the alkyl and alkenyl radicals or aryl radicals as defined for R and R" in formula III can be substituted.

34. A process according to claim 1, wherein said hydrolytic polycondensation material further comprises at least one compound selected from the group consisting of:
(1) a compound of formula V $$X_a SiR_{4-a} \qquad (V)$$

wherein
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
X=hydrogen, halogen, hydroxyl, alkoxy, acyloxy, alkylcarbonyl, alkoxycarbonyl or NR"$_2$, where R"=hydrogen, alkyl, aryl or alkylaryl,
a=1, 2 or 3; and
(2) a precondensate derived from a compound of formula V;
wherein said hydrolytic polycondensation is conducted by adding a substance selected from the group consisting of water, a solvent, and a condensation catalyst, and wherein said molar ratio of the sum of the compound(s) of formulaes I, II, III and IV to the sum of compound(s) of formula V is between 1:0 and 1:20.

35. A process according to claim 34, wherein after curing according to step (c), the organic compounds are removed by thermal cracking.

36. A semi-permeable membrane produced by a process as claimed in claim 35.

37. A semi-permeable membrane as claimed in claim 36 wherein the membrane is self-supporting.

38. A semi-permeable membrane as claimed in claim 36 wherein the membrane has a flat or tubular form.

39. A semi-permeable membrane produced by a process as claimed in claim 34.

40. A semi-permeable membrane as claimed in claim 39, wherein the membrane is self-supporting.

41. A semi-permeable membrane as claimed in claim 39, wherein the membrane has a flat or tubular form.

42. A process according to claim 1, wherein the curing step (c) is performed in the presence of additives which are addition-copolymerizable and/or can be subjected to an addition and/or polyaddition step, although the said additions are not necessarily required for said curing.

43. A process according to claim 42, wherein after curing according to step (c), the organic compounds are removed by thermal cracking.

44. A semi-permeable membrane produced by a process as claimed in claim 42.

45. A semi-permeable membrane as claimed in claim 44 wherein the membrane is self-supporting.

46. A semi-permeable membrane as claimed in claim 44 wherein the membrane has a flat or tubular form.

47. A process according to claim 1, wherein after curing according to step (c), the organic components are removed by thermal cracking.

48. A semi-permeable membrane produced by a process as claimed in claim 47.

49. A semi-permeable membrane as claimed in claim 48 wherein the membrane is self-supporting.

50. A semi-permeable membrane as claimed in claim 48, wherein the membrane has a flat or tubular form.

* * * * *